United States Patent
Wu et al.

(10) Patent No.: US 6,467,897 B1
(45) Date of Patent: Oct. 22, 2002

(54) ENERGY CURABLE INKS AND OTHER COMPOSITIONS INCORPORATING SURFACE MODIFIED, NANOMETER-SIZED PARTICLES

(75) Inventors: Dong Wu, Woodbury; Brant U. Kolb, Afton; Kevin M. Eliason, Forest Lake; Kanta Kumar, Maplewood; Jennifer L. Lee, Eagan; Bruce A. Nerad, Oakdale; Jessica L. Voss, New Brighton; Caroline M. Ylitalo, Stillwater, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 78 days.

(21) Appl. No.: 09/756,303

(22) Filed: Jan. 8, 2001

(51) Int. Cl.$^7$ .................................................. B41J 2/01
(52) U.S. Cl. ..................................................... 347/102
(58) Field of Search ................................. 347/102, 101; 101/488, 487, 424.1; 219/216; 346/25; 399/320; 29/890.1; 118/58; 34/250, 254, 248, 249

(56) References Cited

U.S. PATENT DOCUMENTS

| | | |
|---|---|---|
| 3,953,214 A | 4/1976 | Lipson et al. |
| 4,204,010 A | 5/1980 | Kramm et al. |
| 4,270,985 A | 6/1981 | Lipson et al. |
| 4,627,876 A | 12/1986 | Fries et al. |
| 4,896,598 A | 1/1990 | Leech, Jr. |
| 5,009,536 A | 4/1991 | Inoue et al. |
| 5,021,802 A | 6/1991 | Allred |
| 5,376,169 A | 12/1994 | Hotomi et al. |
| 5,395,863 A | 3/1995 | Burns et al. |
| 5,476,540 A | 12/1995 | Shields et al. |
| 5,683,752 A | 11/1997 | Popp et al. |
| 5,973,036 A | 10/1999 | Matzinger et al. |
| 5,984,559 A | 11/1999 | Shiobara et al. |
| 5,989,325 A | 11/1999 | Sacripante et al. |

FOREIGN PATENT DOCUMENTS

| | | |
|---|---|---|
| DE | 198 45 496 | 4/2000 |
| EP | 0 329 026 B1 | 11/1993 |
| EP | 0 453 307 B1 | 6/1996 |
| EP | 0 761 782 A1 | 3/1997 |
| EP | 0 760 285 B1 | 3/1999 |
| EP | 0 704 504 B1 | 12/1999 |
| EP | 0 659 039 B1 | 3/2000 |
| JP | 52-154409 | 12/1977 |
| JP | 8-325491 | 12/1996 |
| WO | WO 89/07878 | 8/1989 |
| WO | WO 91/17302 | 11/1991 |
| WO | WO 95/15266 | 6/1995 |
| WO | WO 99/11727 | 3/1999 |
| WO | WO 00/10933 | 3/2000 |

OTHER PUBLICATIONS

Khan et al., "Rheology of the Gelation of Fluorine–Doped Silica Sols", *Journal of Non–Crystalline Solids* 110, pp. 153–162, 1989.

(List continued on next page.)

Primary Examiner—Raquel Yvette Gordon

(57) ABSTRACT

Compositions that incorporate relates to compositions that incorporate surface modified, nanometer sized, inorganic oxide particles into energy curable fluids. The surface modification aspect allows the compatibility between the particles and fluid to be controllably adjusted to achieve a wide range of rheological characteristics. For printing, preferred compositions have favorable dot gain and thickness build up. When the composition is cured, the presence of the particles also helps improve physical properties such as hardness, modulus, abrasion resistance, refractive index, and the like. The compositions are particularly well-suited for forming printed, radiation cured features on substrates such as paper, signs, walkways, roadways, motor vehicles, boats, aircraft, furniture, equipment, and the like.

33 Claims, 1 Drawing Sheet

OTHER PUBLICATIONS

Raghavan et al., "Shear–induced microstructural changes in flocculated suspensions of fumed silica", *J. Rheol.* 39(6), pp. 1311–1325, 1995.

Raghavan et al., "Composite Polymer Electrolytes Based on Poly(ethylene glycol) and Hydrophobic Fumed Silica: Dynamic Rheology and Microstructure", *Chem. Mater.*, 10, pp. 244–251, 1998.

Fan et al., "Composite polymer electrolytes using surface–modified fumed silicas: conductivity and rehology", *Solid State Ionics* 111, pp. 117–123, 1998.

Jokinen et al., "Viscoelastic characterization of three different sol–gel derived silica gels", *Colloids and Surfaces, A: Physicochemical and Engineering Aspects* 141, pp. 205–216, 1998.

Rueb et al., "Rheology of suspensions of weakly attractive particles: Approach to gelation", *J. Rheol.* 42(6), pp. 1451–1476, 1998.

Chen et al., "Characteristics of Flocculated Silica Dispersions", *Journal of Colloid and Interface Science*, vol. 141, No. 2, pp. 564–577, 1991.

U.S. application No. 09/422,610, Lamon et al., filed Oct. 21, 1999, entitled "Adhesive Article".

U.S. application No. 09/756,312, filed Jan. 8, 2001, entitled "Methods and Compositions for Ink Jet Printing of Pressure Sensitive Adhesive Patterns or Films on a Wide Range of Substrates".

ENERGY CURABLE INKS AND OTHER COMPOSITIONS INCORPORATING SURFACE MODIFIED, NANOMETER-SIZED PARTICLES

FIELD OF THE INVENTION

The present invention relates to compositions including an energy curable fluid vehicle and surface modified, nanometer-sized particles. The inventive compositions have utility in a wide range of applications, but are particularly suitable for use as printing inks, including ink jet printing inks.

BACKGROUND OF THE INVENTION

Inks are widely used in a variety of printing and coating processes including, for example offset, intaglio, rotogravure, ink jet, flexographic, screen, and spraying techniques. It would be desirable for the inks to remain in a free flowing fluid state during the fluid deposition step, yet undergo rapid self-fixing shortly thereafter to produce durable, non-smearable features on a final receptor material. In many instances, it is desirable to be able to build thickness without substantial spreading of the fluid. The art continuously searches for novel methods to control and improve the rheological characteristics of fluid inks, particularly the rate of self-fixing, which in turn yields better print quality, efficiency and higher speed in the various printing and coating processes.

Ink jet imaging techniques have become very popular in commercial and consumer applications. Ink jet printers operate by ejecting a fluid (e.g., ink) onto a receiving substrate in controlled patterns of closely spaced ink droplets. By selectively regulating the pattern of ink droplets, ink jet printers can produce a wide variety of printed features, including text, graphics, images, holograms, and the like. Moreover, ink jet printers are capable of forming printed features on a wide variety of substrates, including not just flat films or sheets, but also three-dimensional objects as well.

Thermal ink jet printers and piezo ink jet printers are the two main types of ink jet systems in widespread use today. For both approaches, the jetted fluid must meet stringent performance requirements in order for the fluid to be appropriately jettable and for the resultant printed features to have the desired mechanical, chemical, visual, and durability characteristics. In particular, fluids must have relatively low viscosity when jetted, yet must be able to form accurate, durable images on the desired receiving substrate. For example, a typical fluid for thermal ink jetting must typically have a viscosity in the range of 3 to 5 millipascal·seconds (mPa·s) at 25° C., while piezo ink jet fluids must typically have a viscosity in the range of 10 to 30 mPa·s at the printhead temperature. The need to use low viscosity fluids (e.g., inks) may make it challenging to obtain printed features with sufficient thickness and resolution to achieve good mechanical, chemical, visual, and durability characteristics.

Phase change inks (e.g., wax based) have been used for a variety of printing processes including piezo ink jet printing. Typically these inks include a dye or pigment mixed with a vehicle made of wax and/or a thermoplastic polymer that is solid at room temperature, but fluid at the printhead temperature (typically greater than 100° C.). Since such inks solidify rapidly when printed on the substrate, they give consistent image quality that is independent of the type of substrate used. However, the durability of such phase change ink compositions is typically poor, since they may scratch off easily. This is especially the case when the inks are printed onto non-porous plastic surfaces. Further, due to the waxy nature of the vehicle used in conventional phase change inks, the inks typically have poor adhesion to many substrates.

Organic solvent-based and water-based jettable inks are also well known. A typical water-based ink generally comprises a colorant, which may be a dye and/or a pigment, one or more organic co-solvents, and one or more additives that are included to enhance the performance of the ink. Representative examples of such additives include one or more colorants, slip modifiers, thixotropic agents, tack promoting agents, tack reducing agents, foaming agents, antifoaming agents, flow or other rheology control agents, waxes, oils, plasticizers, binders, antioxidants, fungicides, bactericides, organic and/or inorganic filler particles, leveling agents, opacifiers, antistatic agents, dispersants, and the like.

Printed, and especially ink jet printed compositions also require good dot gain characteristics. Dot gain refers to the degree to which a printed feature spreads out upon application to a substrate. If a printed feature (e.g., a dot or line) spreads out too much on the substrate, the resultant image may tend to have poor resolution. On the other hand, if a printed feature spreads insufficiently upon application to the substrate, then poor image density may result. Dot gain characteristics depend upon factors including the nature of the ink composition, printing conditions, and the nature of the substrate. Some inks show favorable dot gain characteristics on some substrates, but not on others.

It would be desirable to provide ink compositions that have consistently good dot gain characteristics with a wide variety of different porous and nonporous substrates.

It is known that inorganic oxide filler can be incorporated into radiation curable ink compositions in order to increase mechanical and durability properties such as hardness, modulus, abrasion resistance, and refractive index as compared to unfilled systems. The presence of such particles is also believed to decrease not only shrinkage upon curing, but also the coefficient of thermal expansion of the resultant cured composition. Unfortunately, however, incorporating conventional inorganic oxide filler into fluid compositions generally causes the compositions to phase separate, settle, clog printheads during use, lose of optical transparency, and the like with even relatively minor weight loadings of the particles. Such an increase in viscosity is a serious drawback for applications, such as ink jetting, in which relatively low viscosity is necessary for the compositions to be jettable.

Accordingly, it also would be highly desirable to find a way to improve mechanical and durability properties of radiation cured ink compositions without experiencing one or more of the drawbacks of conventional fillers.

SUMMARY OF THE INVENTION

The present invention relates to compositions that incorporate surface modified, nanometer sized, inorganic oxide particles into energy curable fluids. The surface modification aspect allows the compatibility between the particles and fluid to be controllably adjusted to achieve a wide range of Theological characteristics. When cured, the presence of the particles also helps improve physical properties such as hardness, modulus, abrasion resistance, refractive index, and the like. The compositions are particularly well-suited for forming printed, radiation cured features on substrates such as paper, signs, walkways, roadways, motor vehicles, boats, aircraft, furniture, equipment, and the like.

Although the compositions are useful in many applications, they are especially useful for ink jet printing applications. The nanometer size of the particles allows the compositions to be ink jetted without clogging the printhead nozzles. The size of the particles is also below light scattering range so that the particles do not interfere with optical clarity or light transparency. Accordingly, although optical additives such as colorants or the like may be incorporated into the formulations, transparent coatings reinforced with the nanometer-sized particles are easily prepared. The surface-treated particles may also be functionalized with energy curable moieties, which allows the particles to react with the energy curable fluid vehicle during curing. This provides the cured compositions with additional reinforcement if desired.

Embodiments of the invention may be formulated with surface modified particles that are only marginally compatible with the fluid vehicle. A wide range of rheological properties can be achieved with this approach. Some embodiments of such compositions are highly thixotropic. The viscosity of the nanocomposite compositions drops dramatically under relatively high shear rates, whereas the viscosity rapidly builds up at relatively low shear rates. This characteristic makes it easy to apply the compositions in the fluid state, while the tendency to thicken after application helps to keep the material in place. Such thermally reversible behavior is useful in many applications, particularly ink jet printing.

For example, in a preferred aspect, the surface modification on the particles may be selected to form compositions that may exist as a gel phase or a fluid phase depending upon the temperature and/or the applied shear rate. By appropriate choice of surface treatment agent(s), either particle-particle or particle-binder precursor interactions can be controllably favored, depending upon the level of energy imparted to the compositions. For example, at room temperature in the absence of shear, sonic, or other energy, such preferred embodiments exist in a gel or other thickened state. Gel formation in particular is believed to result from particle-particle interactions that cause reversible agglomeration of the particles. These particle-particle interactions, however, are weak enough to be broken down by the application of shear energy, sonic energy, heat energy, and/or the like. For example, when heated to about 45° C. to about 80° C., preferred compositions change from a gel phase to a fluid phase with ink jettable viscosity. When cooled to room temperature, the gel reforms.

This reversible characteristic provides many advantages, including controlled dot gain, enhanced ability to rapidly print fine features, and enhanced ability to build print thickness in ink jet printing. During printing, the compositions are in a low viscosity state. After printing, the compositions quickly thicken or gel (as the case may be) and may be radiation cured to form tough, durable features. The unique rheological properties of the compositions are also useful in screen printing, spin coating, three-dimensional model prototyping, fabricating microelectronic circuits, and other printing applications.

It has also been found that the elasticities of the gel-forming compositions of the invention when shear thinned are much lower than those of conventional shear thinning compositions having comparable viscosities. This leads to very low amounts of stringing, which is advantageous for ink jetting, screen printing, spin coating, and other printing applications.

Consequently, it can be appreciated that the compositions of the present invention offer many advantages for printing applications, especially ink jet printing. Firstly, the compositions can be jetted with a heated ink jet printhead. At moderate temperature, e.g., about 60° C., preferred compositions become flowable, preferably substantially Newtonian fluids with a low, ink jettable viscosity. Jetted compositions of the present invention undergo rapid thickening, preferably gelation, on or before contact with a room temperature substrate. The thickening or gel-forming characteristic offers excellent placement control. Printed features have very controllable dot gain, reduced bleed and exceptionally sharp line edges, especially when printed on nonporous substrates. Dot gain has been difficult to control well when some conventional inks have been printed onto nonporous substrates.

The gel character of preferred compositions of the invention offers tremendous control for building print thickness, because the gel materials are much more effective at building print height than fluid materials. This is very desirable in many applications including the fabrication of microelectronic circuits and in fabricating three-dimensional prototypes.

Unlike conventional phase change inks that rely upon waxy materials containing crystalline domains that scatter light and adversely impact transparency, preferred gel-forming compositions of the present invention are optically clear due to small, nanoparticles. Transparent inks and coatings are desirable in many applications, including applying features and/or coatings onto retroreflective substrates for sign applications.

Preferred gel-forming compositions tend to have substantially no yield stress when in the low viscosity state, yet tend to have a measurable yield stress of at least about 0.1 Pascals when gelled. The yield stress of the gel state helps prevent particle agglomeration and settling. Accordingly, the compositions of the invention have excellent storage stability.

Compositions of the invention are not just useful as phase change inks and coatings. For example, the compositions may be used to form covercoats or edge dams on microelectronic devices. Due to the ability to build print thickness so easily, the compositions may also be used for three-dimensional printing in rapid prototyping applications or printing of pressure-sensitive adhesives and/or their radiation-curable precursors.

Other embodiments of the invention may be in the form of relatively low viscosity, substantially Newtonian fluids. These generally result by the use of surface modified particles that have a high degree of compatibility with the fluid vehicle and preferably have energy curable functionality so as to be reactive with the precursor upon curing. The compatibility aspect of the particles has a significant effect upon the rheology of the compositions in that well-dispersed, stable, low viscosity organosols are obtained even with relatively large volume fractions of the particles. Notably, the rate at which the viscosity of these compositions increases with increased particle weight loading is dramatically reduced as compared to systems in which such compatibility is absent.

For example, preferred low viscosity embodiments of the present invention comprising as much as about 10, preferably as much as about 25, volume percent of the particles still retain an ink jettable viscosity over a fairly wide temperature range. This is a remarkable achievement, considering that incorporating only about 5 volume percent of conventional particles, e.g., untreated fumed silica, into a binder precursor renders the compositions too thick to be ink jetted. As an additional benefit, the viscosity characteristics are also substantially Newtonian until relatively high weight loadings of above about 10, preferably up to about 20, volume percent are reached.

The ability to incorporate these highly compatible particles into formulations without an undue increase in viscosity, even with loadings up to about 10 to 25 volume percent, allows cured and uncured compositions of the present invention to enjoy many desired rheological, mechanical, and durability advantages. These advantages include improved hardness, modulus, abrasion resistance, outdoor weatherability, and refractive index. Additionally, the radiation curable reactivity of the preferred particles allows the particles to attachably react with the binder matrix upon curing, resulting in additional reinforcement. Shrinkage upon curing and the coefficient of thermal expansion should also be reduced as compared to an unfilled system.

In one aspect, the present invention relates to a method of forming an ink jetted feature. A composition with an ink jettable viscosity is provided. The composition includes a plurality of nanometer-sized, surface modified, inorganic oxide particles dispersed in an energy curable fluid vehicle. The composition is ink jetted onto a substrate to form a printed feature. The printed feature is exposed to an amount of curing energy under conditions effective to at least partially cure the energy curable fluid.

In another aspect, the present invention relates to an ink jettable composition with reversible gel characteristics. The composition includes an energy curable, fluid vehicle and a plurality of nanometer-sized particles that are marginally compatible with the fluid vehicle and that are present in an amount such that the composition has a gel state and a fluid state in which the composition has an ink jettable viscosity.

In another aspect, the present invention relates to a composition with reversible gel characteristics that includes an energy curable, fluid vehicle comprising a first, relatively polar, constituent and a second, relatively nonpolar constituent. At least one of the constituents is radiation curable. The composition also includes a thickening agent comprising surface treated, nanometer-sized inorganic oxide particles comprising relatively polar and nonpolar surface portions in relative amounts effective to render the thickening agent marginally compatible with the fluid vehicle.

In another aspect, the present invention relates to a method of making an ink jettable composition. An energy curable, fluid vehicle comprising a first, relatively polar, constituent and a second, relatively nonpolar constituent is provided. At least one of the constituents is radiation curable. A gel forming agent also is provided. The gel forming agent comprises surface treated, nanometer-sized inorganic oxide particles comprising relatively polar and nonpolar surface portions in relative amounts such that the gel forming agent is marginally compatible with the fluid vehicle. A gel forming amount of the gel forming agent is incorporated into the fluid vehicle.

In another aspect, the present invention relates to a method of printing. A radiation curable ink is provided that has reversible gel and shear thinned states. The composition is printed onto a substrate to form a printed feature, wherein at least a portion of said printing occurs while the ink is shear thinned. After printing, the printed feature is gelled and then radiation cured.

In another aspect, the present invention relates to a printed feature. The features includes an energy cured binder formed from ingredients comprising an energy curable fluid composition. The composition also includes a gel forming agent dispersed in the binder, said gel forming agent being marginally compatible with the radiation curable fluid composition.

In another aspect, the present invention relates to an energy curable, ink jettable composition. The composition comprises an energy curable fluid vehicle, and a plurality of nanometer-sized particles incorporated into the vehicle. The particles are sufficiently compatible with the vehicle such that the composition has a substantially Newtonian viscosity profile at a desired printhead temperature when the composition incorporates up to at least about 10 volume percent of said particles.

In another aspect, the present invention relates to an energy curable, ink jettable composition. The composition includes an energy curable fluid vehicle and a plurality of nanometer-sized, surface modified, inorganic oxide particles dispersed in the vehicle. The nanometer-sized, surface modified, inorganic oxide particles are sufficiently compatible with the vehicle such that the composition has an ink jettable viscosity at a desired printhead temperature when the composition comprises at least about 10 volume percent of said particles. Additionally, the surface modified particles are obtained by surface treating inorganic oxide substrate particles with a combination of surface treatment agents comprising a first surface treatment agent comprising a radiation curable moiety and a moiety reactively attachable to the substrate particles; and a second surface treatment agent comprising a branched moiety and a moiety reactively attachable to the substrate particles.

In another aspect, the present invention relates to a method of making an energy curable, ink jettable composition. An energy curable fluid vehicle is provided. A plurality of nanometer-sized particles also are provided, and these are sufficiently compatible with the vehicle such that a mixture comprising the particles in the vehicle has an ink jettable viscosity at a desired printhead temperature when the composition comprises at least about 10 volume percent of said particles. Ingredients comprising the particles are incorporated into the vehicle to provide the composition.

In another aspect, the present invention relates to a method of printing. An ink jettable composition is provided that includes a plurality of nanometer sized particles dispersed in an energy curable vehicle fluid. The particles are sufficiently compatible with the vehicle such that a mixture comprising the vehicle and the particles has an ink jettable viscosity at the desired printhead temperature when the mixture comprises at least about 10 volume percent of said particles. The composition is printed onto a substrate to form a printed feature. The printed feature is cured.

DETAILED DESCRIPTION OF PRESENTLY PREFERRED EMBODIMENTS

Figure 1:
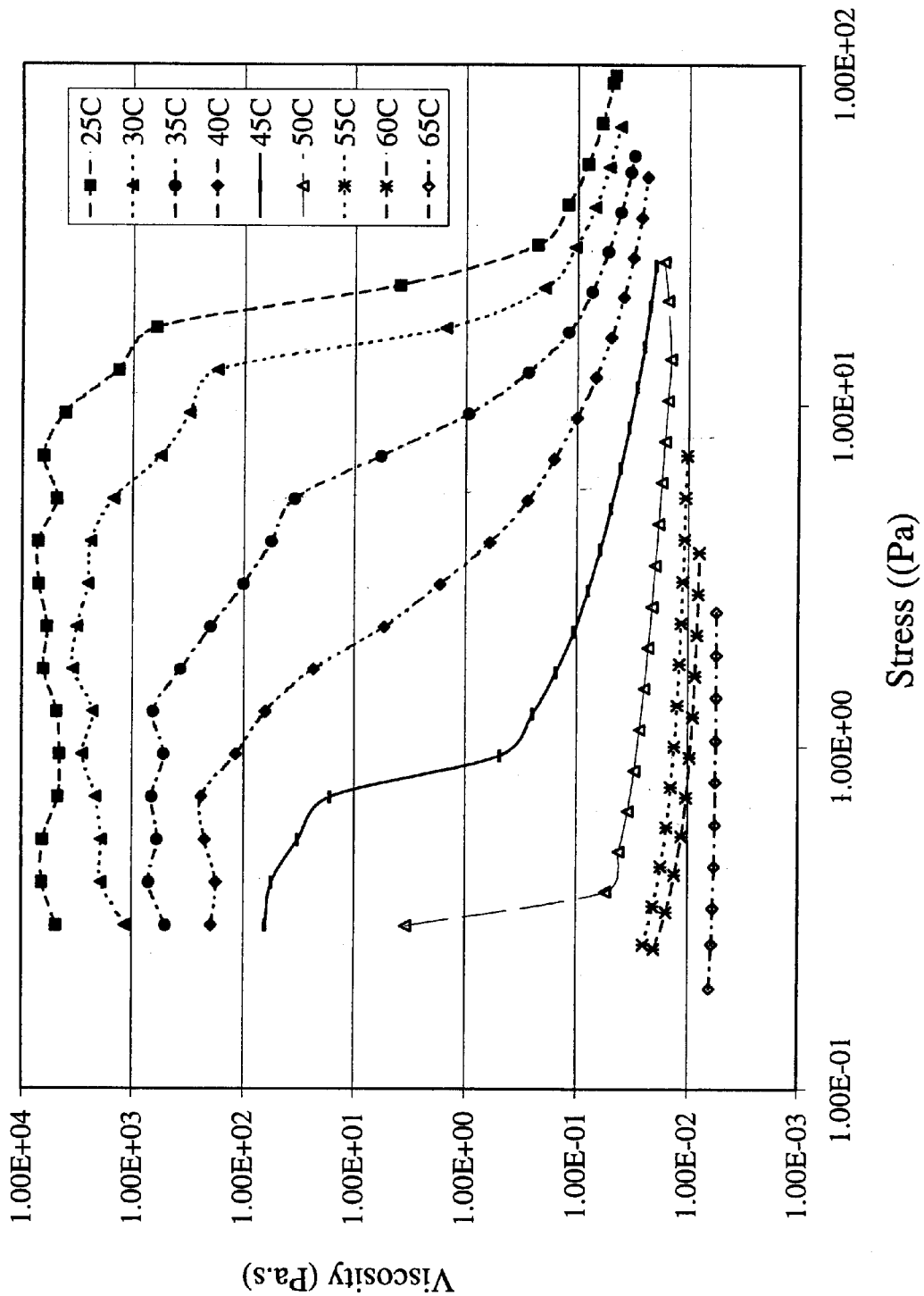
FIG. 1 is a graph showing the viscosity and gel performance of compositions of the present invention as a function of temperature.

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

In preferred embodiments of the invention, surface-modified, nanometer-sized, inorganic oxide particles are incorporated into energy-curable, fluid vehicles. Preferred surface modified, nanometer-sized particles of the present invention are prepared by reacting one or more appropriate surface treatment agents with one or more different kinds of inorganic oxide substrate particles. By themselves, conventional fillers such as fumed silica tend to be incompatible with many fluid carriers and can agglomerate, settle, clog printheads, and impair transparency. Significant thickening may be seen even with relatively minor amounts of such filler. Also, such fillers, especially fumed silica, tend to form permanent clusters of aggregated particles. This is extremely undesirable in ink jetting applications where ink compositions must be jettable through very tiny nozzle orifices. Additionally, when compositions including such aggregates are filtered through a 1 micrometer filter, a substantial portion of the particle content of the compositions is removed. Thus, the content of compositions made from conventional filler may change dramatically and unpredictably during use, especially if ink jetted (i.e., if ink jetting is even possible), or passed through the tiny orifices of a screen during screen printing, or the like.

In sharp contrast, in some representative embodiments, surface modified particles of the present invention tend to be very well-dispersed in corresponding fluid vehicles. In other representative embodiments, surface modified particles of the present invention tend to form non-permanent agglomerations (not aggregates) of particles that readily break up in the presence of a sufficient level of shear, sonic, thermal, or other energy into small, particle bodies. In either of such embodiments, the compositions may be passed through a 1 micrometer, preferably 0.45 micrometer, filter with substantially no loss, if any, of particle content. Moreover, the shear thinning characteristic is exhibited in combination with very little elasticity. This beneficial combination of shear thinning and low elasticity allows the compositions to be applied onto a wide range of substrates with minimal loss, if any, of particle content using standard printing techniques such as screen printing or ink jet printing.

The particles advantageously allow physical properties of the compositions to be improved while also allowing selection and control of rheological characteristics. In terms of physical advantages, incorporation of the surface treated particles into compositions may improve several properties of the resultant cured compositions, including hardness, modulus, abrasion resistance, and refractive index when compared to otherwise identical formulations that do not include the particles. At the same time, the small particle size allows properties such as optical clarity, and ductility to be preserved. It is believed that the particles also help to reduce shrinkage that might otherwise occur upon curing. The coefficient of thermal expansion should also be reduced. The surface treated particles optionally can include functionality (e.g., energy curable moieties) to allow the particles to react with the energy curable fluid carrier for additional reinforcement.

In terms of Theological selection and control, preferred surface modifications of the present invention generally result by treating the substrate particles with one or a mixture of two or more surface treatment agents of differing degrees of compatibility with the fluid vehicle (e.g., polarity, solubility, or the like). The use of combinations of surface treatment agents allows the degree of compatibility with the vehicle to be adjusted easily by varying the relative amounts of the surface treatment agents until the desired Theological characteristics are obtained. Treatments that are more compatible with the fluid vehicle tend to provide fluid, relatively low viscosity, substantially Newtonian compositions. Treatments that are only marginally compatible with the fluid vehicle tend to provide compositions that exhibit one or more of thixotropy, shear thinning, and/or reversible gel formation, preferably in combination with low elasticity. Treatments that are more incompatible with the fluid vehicle tend to provide formulations that tend to settle, phase separate, agglomerate, or the like. Thus, it can be appreciated that the surface modification approach offers tremendous control and flexibility over rheological and mechanical characteristics.

As used herein, "marginally compatible" means that addition of the particles to a fluid causes the fluid to have a state in which the fluid exhibits a greater degree of thixotropic, thickening, gelling, and/or shear-thinning characteristics as compared to a fluid lacking such particles. More preferably, "marginally compatible" means that addition of the particles to a fluid causes the resultant composition to have a state in which the composition is a thermally reversible and/or shear thinning gel. Advantageously, such compositions are easily converted between the gel and fluid states by application of a sufficient amount of energy, e.g., thermal energy, sonic energy, shear energy, and/or the like.

Preferably, a combination comprising relatively polar and nonpolar surface treatments are used to achieve surface modification. The use of such a combination of surface treatment agents allows the compatibility between the surface modified particles and the fluid vehicle, in one preferred mode of practice, to be easily adjusted by varying the relative amounts of such agents. Of course, as another option in certain cases, a single surface modification component may also be used. Alternatively or in addition to this approach, the fluid vehicle also may comprise relatively polar and nonpolar constituents. This approach also allows the degree of compatibility with the particles to be adjusted by varying the relative amounts of such fluid constituents.

As used in the context of the present invention, the terms "polar" and "nonpolar" refer to the degree of charge polarization or dipole moment associated with a material. For example, for a surface treatment agent, the pertinent constituent for which polar or nonpolar character is important is associated with the pendant moiety of the particle-bound coupling agent (i.e., the portion that contacts the fluid vehicle). It should be noted that polarity differences need only be relative, not absolute. Thus, for the coupling agent pair 3-methacryloyloxypropyltrimethoxysilane/isooctyltrimethoxysilane the 3-methacryloyloxypropyltrimethoxysilane is the relatively polar component. For the coupling agent pair methacryloyloxypropyltrimethoxysilane/N-(3-triethoxysilylpropyl) methoxyethoxyethyl carbamate the methacryloyloxypropyltrimethoxysilane is the relatively non-polar component. Similarly, for a fluid vehicle including the monomer pair isobornyl acrylate and N-octylacrylamide, N-octylacrylamide is the relatively polar component.

Particularly preferred compositions are in the form of thickened fluids or gels that exhibit desirable thinning behavior, preferably having low elasticity and substantially no yield stress when in the fluid state. Gelling and/or thickening properties preferably result by selecting a surface modification that renders the particles only marginally compatible with the vehicle fluid so as to promote the desired thickening, thixotropic, shear-thinning, and/or gelling characteristics. Marginally compatible thickening agents tend to provide systems in which Theological behavior depends upon the amount of energy imparted to the system. For example, preferred composition embodiments may exist as a transparent, clear gel at room temperature and low (or no)

shear. Upon imparting higher shear, heating to a higher temperature (e.g., about 60° C.), and/or imparting sonic or other suitable energy to the composition, the gel is transformed into a low viscosity fluid. Upon cooling and/or removing the sonic and/or shear energy, the gel reforms. In contrast, and as described below, embodiments containing highly compatible surface modifications tend to favor particle/vehicle interactions. Typically, low viscosity fluids without gel characteristics tend to result. In further contrast, embodiments of highly incompatible thickening agents tend to result in systems without gel properties in which the particles flocculate, strongly agglomerate and/or aggregate, or otherwise phase separate from the fluid vehicle.

Indeed, embodiments of the present invention incorporating marginally compatible particles tend to have sufficiently low viscosity properties when placed under shear, heated, and/or subjected to other forms of energy so that the fluid compositions advantageously may be applied to receiving substrates using ink jetting techniques. Preferably, compositions of the present invention have a viscosity of below about 30 mPa·s, preferably below about 25 mPa·s, more preferably below about 20 mPa·s at the desired ink jetting temperature. However, the optimum viscosity characteristics for a particular composition will depend upon the type of ink jet system that will be used to apply the composition onto the substrate. For example, for piezo ink jet applications, a typical desired viscosity is about 3 to about 30 mPa·s at the print head temperature. Due to potential volatility and reactivity of one or more constituents of the radiation curable compositions, the fluid compositions preferably are jetted at temperatures no higher than about 80° C., and more preferably no higher than about 60° C.

Formulations of compositions of the present invention with reversible gel characteristics may preferably be obtained according to the following screening methodology. First, a first fluid component (e.g., fluid monomer, polymer, oligomer, combinations thereof, other solvent, or the like), which preferably is the major component of the fluid vehicle vehicle, is selected. Then, a screening test is conducted to assess the compatibility between this first component and various surface modified nanoparticles obtained by using various ratios of two or more, preferably two, surface treatment agents to find particular ratios of surface treatment agents that produce a well-dispersed, fluid sol of the particles incorporated into the first component. This screening typically is carried out using about 15 to about 60 weight percent of the surface treated particles dispersed in the first fluid component.

To carry out such methodology, the surface treatment agents are selected such that at least one is relatively polar and at least one is relatively nonpolar. The Theological characteristics of different molar ratios of such agents are then assessed. For example, the various molar ratios of relatively polar surface treatment agent to relatively nonpolar surface treatment agent used for the screening test may be for example 100:0, 90:10, 80:20, 70:30, 60:40, 50:50, 40:60, 30:70, 20:80, 10:90, 0:100, respectively. It has been found, typically, that if the main component of the fluid vehicle is a nonpolar fluid, the preferred surface modified nanoparticles will have a majority of nonpolar functionality on their surface when compared to polar functionality (and vice versa). Preferably, the surface treatment agents are used in amounts such that the particle surface coverage is less than or equal to about 110 percent, and more preferably from about 90 to 100 percent of the amount needed for monolayer coverage of the particles to be surface treated. The term "monolayer coverage" refers to the maximum amount of coupling agent that chemically reacts with the particles in the composition.

Such screening should allow one to identify one or more different kinds of surface treated particles that are compatible with the first fluid component. Having identified such compatible surface modified particles, a sol of the compatible surface modified particles in the first fluid component is prepared at a higher concentration of the compatible surface modified nanoparticles than desired in the final composition. For example, if 20 to 25 weight percent of surface treated particles is desired in the final composition, the sol used in the present methodology may be formulated with 30 to 50 weight percent of particles.

Next, a series of formulations is prepared by adding a second fluid component to the sol of the compatible surface modified particles in the first fluid component. The second fluid component is selected so as to have a relatively different polarity than the first fluid component. However, the degree of polarity should not be so different that the two fluid components are immiscible with each other. Preferably, the first and second fluid components are fully miscible. The rheology of the resultant compositions is evaluated to see if the desired behavior results. As the ratio of this second component is increased relative to the first fluid component, the compatibility of the particles in the system will tend to decrease. This results in an increase in viscosity, leading up to a gel in some instances. The sample can be heated and cooled one or more times to check for thermo-reversible character. By this method it is possible to easily obtain thermally reversible gels and thickened compositions according to the invention.

If the gel characteristics are too strong such that gel characteristics are observed but are not reversible, then increments of the more compatible fluid component can be added until reversibility is obtained. The magnitude of thermo-reversibility can vary greatly with only small differences in fluid component ratio. Additionally, if too much of the second component is added, the particles may begin to phase separate on a more macroscopic level. This may cause the sol to become more viscous and/or hazy than is desired. Eventually, a macroscopically phase-separated system (e.g., precipitate) may be formed.

As still another approach, the above methodology can be followed except that it is possible to start with the particles dispersed in the more incompatible fluid component. Increments of the more compatible fluid component may then be added until the desired degree of reversible gel characteristics are obtained. In another approach, it is possible to adjust the polar/nonpolar characteristics of both the fluid vehicle and the surface modifiers, although it is simpler in practice to vary only one of these.

The above described methodology is one way to obtain gels according to the present invention (i.e., by adjusting the relative amounts of the polar/non-polar constituents of the fluid vehicle). Alternatively, the fluid vehicle (i.e., solvent system) may be held constant while the ratio of two different surface modifiers can be varied to adjust the compatibility.

For example, according to the approach in which the relative amounts of the polar/nonpolar surface modifiers is adjusted while holding the nature of the fluid vehicle constant, a screening test is conducted using various ratios of surface treatment agents to find combination(s) of such agents that produce a sol in the fluid vehicle, typically when the modified particles in the composition are present in the range of 15 to 40 weight percent. The surface treatment agents are selected such that at least one is relatively polar and at least one is relatively nonpolar. For example, the various molar ratios used to evaluate two surface treatment agents may be for example 100:0, 90:10, 80:20, 70:30, 60:40, 50:50, 40:60, 30:70, 20:80, 10:90, 0:100 of the relatively polar surface treatment agent to the relatively nonpolar surface treatment agent.

A suitable molar ratio range is easily determined via the screening methodology described herein and will depend on factors including the nature of the radiation curable binder precursor, the nature of the surface treatment agents, and the like. Preferably, molar ratio of the first surface treatment agent to the second surface treatment agent is in the range of 1:5 to 5:1.

Preferably, regardless of the screening method used to identify gel formulations of the present invention, the surface treatment agents are used in amounts such that the particle surface coverage is less than or equal to about 10 percent of the amount needed for monolayer coverage. The preferred molar ratio of relatively polar to relatively nonpolar surface treatment agent will generally be between those ratios having compatibility (e.g., low viscosity, clarity) in the fluid vehicle and those having incompatibility (e.g., precipitation). In this manner, the range of ratios to investigate may be narrowed, and the screening process may be repeated one or more times until a ratio of surface treatment agents is arrived at that leads to gel formation.

In addition to those embodiments with thickening, gelling, thixotropic, and/or shear thinning properties, other preferred embodiments of the invention are in the form of relatively low viscosity, substantially Newtonian fluids. Low viscosity properties result by using surface modified particles with an appropriately high level of compatibility with the fluid vehicle. For example, particles that have very vehicle-compatible surfaces tend to provide systems in which the viscosity of the system increases only moderately with increasing volume percent of particles up to relatively high loadings of particles.

While not wishing to be bound by theory, it is believed that the compatibility between the fluid vehicle and the particle surfaces tends to favor particle-vehicle interactions over particle-particle interactions. When particle-binder precursor interactions are favored, the compositions tend to exist as a low viscosity Newtonian fluid. In contrast, when particle-particle interactions are more favored, the compositions tend to thicken more significantly as the volume percent of particles is increased.

A particularly preferred combination of surface treatment agents for the low viscosity embodiments comprises a (meth)acryloyloxyalkyl organosilane used in combination with a branched aliphatic organosilane. A preferred (meth) acryloyloxyalkyl organosilane is (meth)acryloyloxypropyl-trimethoxysilane, and the preferred branched aliphatic organosilane is a branched alkyl organosilane such as isooctyltrimethoxysilane. This preferred combination provides excellent compatibility with a range of one or more different radiation curable monomers, yielding very desirable viscosity characteristics for ink jetting applications.

Formulations of preferred low viscosity compositions of the present invention may be obtained according to a screening methodology that includes preparing and evaluating a number of test compositions in which the relative amounts of the polar/nonpolar surface modifiers is adjusted while holding the nature of the fluid vehiclevehicle constant. Typically, such test compositions may include 15 to 40 weight percent of particles. For example, the various molar ratios used to evaluate two surface treatment agents may be for example 100:0, 90:10, 80:20, 70:30, 60:40, 50:50, 40:60, 30:70, 20:80, 10:90, 0:100 of the relatively polar surface treatment agent to the relatively nonpolar surface treatment agent. The screening should allow one to identify one or more different kinds of surface modified particles that are highly compatible with the precursor.

It has been found, typically, that if the main component of the fluid vehicle is a nonpolar fluid, the preferred surface modified nanoparticles will have a majority of nonpolar functionality on their surface (and vice versa). Preferably, the surface treatment agents are used in amounts such that the particle surface coverage is less than or equal to about 110 percent, and more preferably from about 90 to 100 percent of the amount needed for monolayer coverage of the particles to be surface modified.

This screening procedure makes it easy to identify an optimum surface treatment ratio for which the viscosity of the resultant composition is at a minimum relative to other ratios. For example, when conducting the screening procedure, viscosity data for the test samples may be gathered for the various ratios of surface treatment agents at a given weight loading of the particles in the fluid vehicle. This data may be obtained at one or more different temperatures. Preferably, the temperature(s) will be at or reasonably proximal to the desired printhead temperature. When the viscosity characteristics are examined as a function of the ratio of surface treatment agents, typically a minimum viscosity or viscosity range at the desired temperature(s) will be observed. Compositions to be used can be prepared with a ratio at or proximal to such minimum in order to provide compositions with optimally low viscosity characteristics.

As one illustrative example, a graph of $\eta_i/\eta_o$ as a function of $R_i$ can be prepared, wherein $\eta_i$ is the viscosity of the sample being tested, $\eta_o$ is the viscosity of a sample with no particles, and $R_i$ is the mole fraction of one surface treatment agent relative to another where a pair of surface treatment agents are being studied. Generally, such a graph will have a minimum at a mole fraction $R_m$ at which at least some of both surface treatment agents are present. By preparing compositions from particles that are surface modified with agents according to a ratio proximal to such minimum, optimally low viscosity properties can be obtained. As used in this context, "proximal" means that the selected ratio is within about ten percent of such a minimum. Such a minimum shall be referred to herein as a viscosity profile minimum.

To obtain low viscosity embodiments, a preferred combination of surface treatment agents that may be advantageously reacted with the inorganic oxide substrate particles comprises first and second surface treatment agents. The first surface treatment agent preferably includes both a moiety that is attachably reactive with at least a portion of the substrate particles as well as a branched moiety. Preferably, one or both of the surface treatment agents further comprises energy curable functionality to allow the surface modified particles to reactively crosslink into the fluid carrier as it cures to form a binder matrix. More preferably, the energy curable functionality is present on the second surface treatment agent.

The molar ratio of the first surface treatment agent to the second surface treatment agent can have an impact upon the desired low viscosity characteristics of the resultant composition into which the surface modified particles are incorporated. A suitable molar ratio range is easily determined via the screening methodology described herein and will depend on factors including the nature of the radiation curable binder precursor, the nature of the surface treatment agents, and the like. Preferably, molar ratio of the first surface treatment agent to the second surface treatment agent is in the range of 1:5 to 5:1, more preferably about 1:1. Rheological behavior can be controlled over a wide range even when working with only a pair of surface treatment agents. By adjusting the weight ratio between the agents of the pair, compositions with low viscosity or gel behavior can be obtained.

Preferred treatment agents of the present invention suitable for forming compositions with a wide range of rheological properties may be represented schematically by the following formula:

$$(X)_r\text{—W—}(A)_s$$

wherein A is the attachably reactive moiety, s is at least 1 to 4, preferably 1; W is a relatively polar or relatively nonpolar moiety (as the case may be) having a valency of r+s, preferably having a skeleton comprising 2 to 30, more preferably 3 to 20 carbon atoms; X is a moiety comprising a free radically or cationically reactive group such as a (meth)acryl moiety; and r is 0 to 4, preferably 0 or 1. In embodiments in which the composition is to function as an ink or the like, r is desirably 1. The attachably reactive moiety A may be monovalently or multivalently (i.e., if A were to be cyclic) linked to W. If A is divalent, for example, both valent sites preferably are linked to W directly.

When preferred embodiments of inorganic particles comprise silica, the attachably reactive moiety A is preferably a silane functional moiety. As used herein, the term "silane functional moiety" refers to a hydrolyzable moiety comprising at least one Si atom bonded to at least one oxygen atom in which the oxygen atom preferably is a constituent of an acyloxy group and/or an alkoxy group. Thus, representative examples of preferred silane functional moieties may be represented by the following formulae;

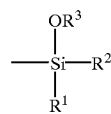  (1)

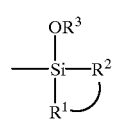  (2)

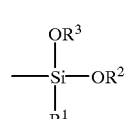  (3)

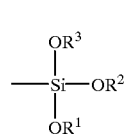  (4)

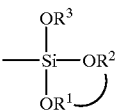  (5)

Generally, any of $R^1$, $R^2$, and $R^3$ of these silane functional moieties independently may be any nonionic, monovalent substituent (or divalent substituent when $R^1$ and $R^2$ collectively form a cyclic substituent as in Formula (2)) other than hydrogen. Additionally, any of $R^1$, $R^2$, and $R^3$ may be linear, branched, or cyclic. Thus, representative examples of moieties suitable for use as any of $R^1$, $R^2$, $R^3$, include any alkyl, aryl, alkaryl, acyl, alkenyl, arylene moieties, combinations thereof, or the like. Any of such moieties, if cyclic, may include a plurality of rings if desired. For example, aryl moieties may be aryl-aryl structures. In preferred embodiments, each of $R^1$, $R^2$, and $R^3$ is independently an alkyl group of 1 to 4 carbon atoms or an acyl group such as acetyl ($CH_3C(=O)$—) or substituted or unsubstituted benzoyl ($C_6H_5C(=O)$—). Most preferably, each of $R^1$, $R^2$, and $R^3$ independently is a lower alkyl group of 1 to 4 carbon atoms, more preferably $CH_3$.

Representative embodiments of surface treatment agents suitable for the marginally compatible or other embodiments include organosilanes such as, for example, isooctyl trimethoxy-silane, N—(3-triethoxysilylpropyl) methoxyethoxyethoxyethyl carbamate (PEG3TMS), N—(3-triethoxysilylpropyl) methoxyethoxyethoxyethyl carbamate (PEG2TMS), 3-(methacryloyloxy)propyltrimethoxysilane, 3-acryloxypropyltrimethoxysilane, 3-(methacryloyloxy) propyltriethoxysilane, 3-(methacryloyloxy) propylmethyldimethoxysilane, 3-(acryloyloxypropyl) methyldimethoxysilane, 3-(methacryloyloxy) propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltrisisobutoxysilane, vinyltriisopropenoxysilane, vinyltris(2-methoxyethoxy)silane, and mixtures thereof. Pairs of relatively polar and nonpolar surface treatment agents may be selected from these and similar materials.

Preferred substrate particles that are surface modified in accordance with the present invention comprise nanometer-sized, inorganic oxide particles such as silica; metal oxides such as alumina, tin oxide, iron oxide, zirconia, vanadia, and titania; combinations of these; and the like. Silica is the most preferred substrate particle. The term "nanometer-sized" refers to particles that are characterized by an average particle diameter in the range of from about 5 nm to about 500 nm, more preferably about 5 nm to about 200 nm, more preferably 5 nm to 100 nm. These size ranges facilitate ease of dispersion of the particles into the fluid vehicle, which preferably comprises a radiation curable binder precursor. Average particle size of the colloids can be measured using transmission electron microscopy to count the number of particles of a given diameter. In the practice of the present invention, particle size may be determined using any suitable technique. Preferably, particle size refers to the number average particle size and is measured using an instrument that uses transmission electron microscopy or scanning electron microscopy. Another method to measure particle size is dynamic light scattering which measures weight average particle size. One example of such an instrument found to be suitable is the N4 PLUS SUB-MICRON PARTICLE ANALYZER available from Beckman Coulter Inc. of Fullerton, Calif.

If not already surface treated in the manner desired, the substrate particles preferably are provided as a sol rather than as a powder or a gel. Preferred sols generally contain from about 15 to about 50 weight percent of colloidal inorganic oxide particles dispersed in a fluid medium. Representative examples of suitable fluid media for the colloidal particles include water, aqueous alcohol solutions, lower aliphatic alcohols, ethylene glycol, N,N-dimethylacetamide, formamide, and combinations thereof. The preferred fluid medium is aqueous, e.g., water and optionally one or more alcohols. When the colloidal particles are dispersed in an aqueous solvent, the particles are stabilized on account of common electrical charges that develop on the surface of each particle. The common electrical charges tend to promote dispersion rather than agglomeration or aggregation, because the similarly charged particles repel one another. By contrast, fumed silica and silica gels are aggregates of fused particles and thus will not as easily provide a uniform dispersion of particles when combined with the binder precursor. Such aggregates also are too big to be conveniently ink jetted.

Sols useful in the practice of the present invention may be prepared by methods well known in the art. Suitable sols also are commercially available. For example, colloidal silicas in aqueous solutions are commercially available under such trade designations as "LUDOX" (E.I. DuPont de Nemours and Co., Inc. Wilmington, Del.), "NYACOL" (Nyacol Co., Ashland, Ma.), and "NALCO" (Nalco Chemical Co., Oak Brook, Ill.). Most of these commercially available sols tend to be basic, being stabilized by alkali such as sodium hydroxide, potassium hydroxide, or ammonium hydroxide. Additional examples of suitable colloidal silicas are described in U.S. Pat. No. 5,126,394, incorporated herein by reference.

The sols used in the present invention generally may include countercations, in order to counter the surface charge of the colloids. Depending upon pH and the kind of colloids being used, the surface charges on the colloids can be negative or positive. Thus, either cations or anions are used as counter ions. Examples of cations suitable for use as counter ions for negatively charged colloids include $Na^+$, $K^+$, $Li^+$, a quaternary ammonium cation such as $NR_4^+$, wherein each R may be any monovalent moiety, but is preferably H or lower alkyl such as $CH_3$, combinations of these, and the like. Examples of counter anions suitable for use as counter ions for positively charged colloids include nitrate, acetate, chloride, etc.

The energy curable fluid vehicle, or binder precursor, of the present invention generally incorporates, in whole or in part, one or more energy curable constituents that can polymerize and/or crosslink when exposed to a suitable source of curing energy. Although one or more individual constituents of the vehicle may be a non-fluid material at room temperature, the one or more constituents combine to form a flowable fluid at least in combination with each other. Subject to other desired performance standards, any energy curable material or combinations thereof may be incorporated into the composition as a reactive, fluid vehicle. Such constituents may include one or more monomers, oligomers, and/or polymers. For ink jet printing applications, such materials, at least in combination, preferably exist as a fluid of ink jettable viscosity at the desired ink jet print head temperature and shear conditions.

As used herein, the term "monomer" means a relatively low molecular weight material (i.e., having a molecular weight less than about 500 g/mole) having one or more energy polymerizable groups. "Oligomer" means a relatively intermediate molecular weight material having a molecular weight of from about 500 up to about 10,000 g/mole. "Polymer" means a relatively high molecular weight material having a molecular weight of at least about 10,000 g/mole, preferably at 10,000 to 100,000 g/mole. The term "molecular weight" as used throughout this specification means number average molecular weight unless expressly noted otherwise.

In the practice of the present invention, "energy curable" refers to functionality directly or indirectly pendant from a surface-treated particle, monomer, oligomer, polymer, or other constituent (as the case may be) that participate in polymerization and/or crosslinking reactions upon exposure to a suitable source of curing energy. Such functionality generally includes not only groups that cure via a cationic mechanism upon energy exposure but also groups that cure via a free radical mechanism. Representative examples of energy curable groups suitable in the practice of the present invention include epoxy groups, (meth)acrylate groups, olefinic carbon-carbon double bonds, allyloxy groups, alpha-methyl styrene groups, (meth)acrylamide groups, cyanate ester groups, vinyl ethers groups, combinations of these, and the like. Free radically polymerizable groups are preferred. Of these, (meth)acryl moieties are most preferred. The term "(meth)acryl", as used herein, encompasses acryl and/or methacryl.

The energy source used for achieving polymerization and/or crosslinking of the curable functionality may be actinic (e.g., radiation having a wavelength in the ultraviolet or visible region of the spectrum), accelerated particles (e.g., electron beam radiation), thermal (e.g., heat or infrared radiation), or the like. Preferably, the energy is actinic radiation or accelerated particles, because such energy provides excellent control over the initiation and rate of polymerization and/or crosslinking. Additionally, actinic radiation and accelerated particles can be used for curing at relatively low temperatures. This avoids degrading or evaporating components that might be sensitive to the relatively high temperatures that might be required to initiate polymerization and/or crosslinking of the energy curable groups when using thermal curing techniques. Suitable sources of curing energy include lasers, electron beams, mercury lamps, xenon lamps, carbon arc lamps, tungsten filament lamps, sunlight, low intensity ultraviolet light (black light), and the like. The use of black light for polymerization tends to form higher molecular weight polymers as compared to many other kinds of curing energy. Accordingly, when it is desired to form higher molecular weight materials upon curing, the use of black light is preferred.

The energy curable monomers generally may be mono-, di-, tri-, tetra- or otherwise multifunctional in terms of energy curable moieties. These monomers function as diluents or solvents for the higher molecular weight constituent (s) (if any), as viscosity reducers, as binders when cured, and as crosslinking agents with respect to other energy curable materials. The amount of such monomers to be incorporated into the reactive fluid vehicle can vary within a wide range depending upon the intended use of the resultant composition. As general guidelines, the fluid vehicle of the present invention may contain from about 25 to about 100, preferably 40 to 98 weight percent of such monomers.

Representative examples of monofunctional, energy curable monomers suitable for use in the reactive fluid vehicle include styrene, alpha-methylstyrene, substituted styrene, vinyl esters, vinyl ethers, N-vinyl-2-pyrrolidone, (meth)acrylamide, N-substituted (meth)acrylamide, octyl (meth)acrylate, iso-octyl (meth)acrylate, nonylphenol ethoxylate (meth)acrylate, isononyl (meth)acrylate, diethylene glycol (meth)acrylate, isobornyl (meth)acrylate, 2-(2-ethoxyethoxy)ethyl (meth)acrylate, 2-ethylhexyl (meth)acrylate, lauryl (meth)acrylate, butanediol mono(meth)acrylate, beta-carboxyethyl (meth)acrylate, isobutyl (meth)acrylate, cycloaliphatic epoxide, alpha-epoxide, 2-hydroxyethyl (meth)acrylate, (meth)acrylonitrile, maleic anhydride, itaconic acid, isodecyl (meth)acrylate, dodecyl (meth)acrylate, n-butyl (meth)acrylate, methyl (meth)acrylate, hexyl (meth)acrylate, (meth)acrylic acid, N-vinylcaprolactam, stearyl (meth)acrylate, hydroxy functional polycaprolactone ester (meth)acrylate, hydroxyethyl (meth)acrylate, hydroxymethyl (meth)acrylate, hydroxypropyl (meth)acrylate, hydroxyisopropyl (meth)acrylate, hydroxybutyl (meth)acrylate, hydroxyisobutyl (meth)acrylate, tetrahydrofurfuryl (meth)acrylate, combinations of these, and the like.

Multifunctional energy curable materials may also be incorporated into the reactive diluent to enhance one or more properties of the cured film, including crosslink density, hardness, tackiness, mar resistance, or the like. If one or more multi-functional species are present, the fluid vehicle may comprise up to about 0 to 50, preferably 0 to 35, more preferably 0 to 15 weight percent of such materials. Examples of such higher functional, energy curable monomers include ethylene glycol di(meth)acrylate, hexanediol di(meth)acrylate, triethylene glycol di(meth)acrylate, tetraethylene glycol di(meth)acrylate, trimethylolpropane tri(meth)acrylate, ethoxylated trimethylolpropane tri(meth)acrylate, glycerol tri(meth)acrylate, pentaerythritol tri(meth)acrylate, pentaerythritol tetra(meth)acrylate, and neopentyl glycol di(meth)acrylate, combinations of these, and the like.

Preferred fluid vehicles of the present invention may be formulated with one or more energy curable monomers or combinations thereof in a manner that results in one or more desirable performance criteria. For example, in those embodiments in which the composition of the present invention is to be a reversible gel, the fluid preferably comprises at least one relatively polar monomer and at least one relatively nonpolar monomer. The relative amounts of these two kinds of constituents can be adjusted to help achieve the degree of compatibility with the surface modified particles that is effective to form a thermally reversible gel. In such preferred embodiments, representative examples of relatively polar monomers include N-octyl(meth)acrylamide, 2-(2-ethoxyethoxy)ethyl (meth)acrylate, (meth)acrylic acid, N-vinylpyrrolidone, 2-hydroxyethyl (meth)acrylate, combinations thereof, and the like. Of these, (meth)acrylic acid, N-vinylcaprolactam, and N-octyl(meth)acrylamide are preferred. Similarly, the preferred relatively nonpolar constituent(s) include isobornyl (meth)acrylate, lauryl (meth)acrylate, isooctyl (meth)acrylate, butyl acrylate, combinations of these, and the like. Isobornyl acrylate and/or isooctyl acrylate are more preferred. Of course, polar and nonpolar character are relative in the practice of the present invention. Accordingly, in some formulations a particular monomer may be relatively polar and vice versa depending upon the other monomer(s) present in the formulation.

A particularly preferred combination of polar and nonpolar, radiation curable monomers comprises, based upon the total weight of the monomers, 10 to 20 parts by weight N-octyl acrylamide, and 80 to 90 parts by weight isobornyl acrylate. Materials such as 2-(2-ethoxyethoxy)ethyl (meth)acrylate may be added to adjust gel strength.

Other kinds of monomer selections can also be made to satisfy one or more other performance criteria. For example, in order to promote hardness and abrasion resistance of resultant cured material, fluid compositions of the present invention advantageously may incorporate radiation curable monomer(s) (hereinafter "high Tg component") whose presence causes the cured material, or a portion thereof, to have a higher glass transition temperature, Tg, as compared to an otherwise identical material lacking such high Tg component. Preferred monomeric constituents of the high Tg component generally include monomers whose homopolymers have a Tg of at least about 50° C., preferably at least about 60° C., and more preferably at least about 75° C. in the cured state. When used, the high Tg component may constitute 0.5 to 50, preferably 0.5 to 40, more preferably 0.5 to 30 weight percent of the radiation curable, reactive diluent.

An exemplary class of radiation curable monomers that tend to have relatively high Tg characteristics suitable for incorporation into the high Tg component generally comprise at least one radiation curable (meth)acrylate moiety and at least one nonaromatic, alicyclic and/or nonaromatic heterocyclic moiety. Isobornyl (meth)acrylate is a specific example of one such monomer. A cured, homopolymer film formed from isobornyl acrylate, for instance, has a Tg of 88° C. The monomer itself has a molecular weight of 208 g/mole, exists as a clear fluid at room temperature, has a viscosity of 9 mPa·s at 25° C., has a surface tension of 31.7 dynes/cm at 25° C., and is an excellent reactive diluent for many kinds of oligomers and/or polymers. In the practice of the present invention, Tg of a monomer refers to the glass transition temperature of a cured film of a homopolymer of the monomer, in which Tg is measured by differential scanning calorimetry (DSC) techniques. 1,6-Hexanediol di(meth)acrylate is another example of a monomer with high Tg characteristics.

In order to promote adhesion both before and especially after radiation curing, fluid compositions of the present invention advantageously may incorporate radiation curable monomer(s) (hereinafter "adhesion promoting component") whose presence causes the uncured and/or cured material to have higher adhesion to the desired receiving substrate as compared to an otherwise identical formulation lacking such adhesion promoting component. Preferred monomeric constituents of the adhesion promoting component generally include monomers having an adhesion score of at least about 50, preferably at least about 80, and more preferably at least about 95 on at least one, preferably at least two, substrates chosen from the group consisting of polymethyl methacrylate, polyvinyl chloride, and polyethylene terephthalate. In the practice of the present invention, adhesion score is measured according to ASTM D 3359-95A Standard Test Methods for Measuring Adhesion by Tape Test, Method B. When used, the adhesion promoting component may comprise 0.5 to about 70, preferably 0.5 to about 50, more preferably 0.5 to about 40 weight percent of the reactive diluent.

A wide variety of monomers with adhesion promoting characteristics may be incorporated singly or in combination into the adhesion promoting component of the reactive diluent. Adhesion promoting monomers are those that tend to diffuse into the substrate to form a physical lock when cured. Such monomers have a measurable diffusion coefficient into the substrate of interest. One such class of monomers comprises one or more (meth)acrylate moieties and one or more alkoxy and/or polyalkoxy moieties. These alkoxylated monomers tend to be characterized by good flexibility, low shrinkage, and impact strength when cured. However, the alkoxy or polyalkoxy moieties of such materials may have a tendency to oxidize over time. This could impair the performance of the resultant cured material, particularly if the alkoxylated functionality is situated in the monomer such that such functionality is positioned as part of a main polymer backbone when the compositions of the present invention are cured. These materials also are compatible only with a limited range of nonporous substrates.

Accordingly, it is preferred to use 0.1 to 50 weight percent of alkoxylated monomers with pendant alkoxylated functionality rather than main chain functionality. It is further desirable to limit the use of alkoxylated monomers comprising such main chain alkoxylated functionality, and preferred reactive diluents comprise no more than about 10 weight percent of such alkoxylated monomers. Limiting the use of alkoxylated monomers for which the alkoxylated functionality becomes pendant from a main polymer backbone is generally not required in the practice of the present invention. Oxidation of such pendant alkoxylated functionality has less of an impact upon bulk polymer properties than does oxidation of main chain alkoxylated functionality.

A specific example of one illustrative alkoxylated monomer is 2-(2-ethoxyethoxy)ethyl acrylate. This monomer is a clear fluid at room temperature and has a viscosity of 6 mPa·s at 25° C., a surface tension of 32.4 dynes/cm at 25° C., and is slightly polar. A cured film of this monomer has a Tg of −54° C. Others include propoxyethyl (meth)acrylate, propoxylated neopentyl glycol di(meth)acrylate, and the like. Propoxylated neopentyl glycol di(meth)acrylate has main chain alkoxylated functionality and is least preferred.

Another class of radiation curable monomers with adhesion promoting characteristics suitable for use in the adhesion promoting component include relatively low Tg monomers comprising at least one heterocyclic moiety and at least one (meth)acrylate moiety. As used herein, low Tg means that a cured homopolymer film of the monomer has a Tg of less than about 40° C., preferably less than about 10° C., and more preferably less than about −10° C. An illustrative embodiment of one such monomer is tetrahydrofurfuryl acrylate. This monomer is an excellent adhesion promoter with respect to many different kinds of porous and nonporous substrates, is a clear fluid at room temperature, has a viscosity of 6 mPa·s at 25° C., a surface tension of 36.1 dynes/cm at 25° C., a Tg of −28° C., and a molecular weight of 156 g/mole.

Combinations of monomers with adhesion promoting characteristics are advantageously used to formulate an adhesion promoting component of the present invention. One particularly preferred combination with very good adhesion promoting properties comprises 1 to 10 parts by weight of an alkoxylated (meth)acrylate per 5 to 15 parts by weight of a heterocyclic (meth)acrylate. A particularly preferred embodiment of such a combination comprises 2-(2-ethoxyethoxy)ethyl (meth)acrylate and tetrahydrofurfuryl (meth)acrylate. N-vinylcaprolactam also promotes adhesion.

In many applications, printing features with good initial gloss and good gloss retention over time is important. For such applications, it may be desirable to incorporate one or more monomers (hereinafter gloss component) into the reactive diluent whose presence provides cured, printed features with better initial gloss and or gloss retention as compared to otherwise identical films lacking such gloss component. Preferred radiation curable reactive diluents comprise a sufficient amount of a gloss component such that a cured, homopolymer film of the material has a 60° gloss of at least 70, preferably at least 90, when measured according to ASTM D 523 Standard Test Method for Specular Gloss. When a gloss component is used, reactive diluents may comprise 0.5 to 30, preferably 0.5 to 15, more preferably 0.5 to 10 weight percent of the gloss component.

A wide variety of suitable monomers may be incorporated singly or in combination into the gloss component. One such class of monomers comprises radiation curable monomers that are solids at room temperature. Although solids by themselves, such monomers tend to be readily soluble in one or more of the other monomers constituting the reactive diluent. Thus, these solid, gloss promoting materials are easily included in ink jettable formulations. A specific example of such a monomer is N-vinylcaprolactam. This monomer is a fluid above about 34° C., has a viscosity of 2.88 mPa·s at 50° C. Another monomeric example includes N-vinylpyrrolidone.

In some instances, one or more monomers incorporated into the reactive diluent may have beneficial properties in one regard, yet may have poor wetting characteristics in terms of being able to wet a wide range of different kinds of porous and nonporous substrates. Tetrahydrofurfuryl acrylate is a good example of this. This monomer has excellent adhesive characteristics, but limited wetting characteristics. Accordingly, in such instances if desired, it may be desirable to incorporate one or more monomers (enhanced wetting component) into the reactive diluent whose presence causes the radiation curable fluid composition to have better wetting properties for the desired substrate(s) as compared to an otherwise identical composition lacking such a component. Preferred constituents of the enhanced wetting component preferably comprise one or more monomers respectively having surface tension properties of about 30 dynes/cm or less.

A wide variety of monomers with such low surface tension properties may be incorporated singly or in combination into the enhanced wetting component. One such class of monomers comprises at least one (meth)acrylate moiety and at least one aliphatic moiety that is straight chained or branched. Preferably, the aliphatic moiety is a branched hydrocarbyl moiety containing 3 to 20 carbon atoms. A specific example of this class of monomers is isooctyl acrylate. This monomer is a clear fluid at room temperature, has a molecular weight of 184, and has a surface tension of 28 dynes/cm at 25° C. Other examples include (meth)acrylate monomers comprising branched hydrocarbon moieties including 3 to 20 carbon atoms.

Energy curable monomers that form all or a portion of a pressure sensitive adhesive upon curing may also be incorporated into the fluid vehicle. Such monomers are further described in Assignee's copending application titled "METHODS AND COMPOSITIONS FOR INK JET PRINTING OF PRESSURE SENSITIVE ADHESIVE PATTERNS OR FILMS ON A WIDE RANGE OF SUBSTRATES" filed concurrently herewith in the names of Chen et al., identified by the entirety of which is incorporated herein by reference.

Oligomers and polymers may also be collectively referred to herein as "higher molecular weight constituents or species". Suitable higher molecular weight constituents may be incorporated into fluid compositions of the present invention in order to provide many benefits, including viscosity control, reduced shrinkage upon curing, durability, flexibility, adhesion to porous and nonporous substrates, outdoor weatherability, and/or the like. The amount of oligomers and/or polymers incorporated into fluid compositions of the present invention may vary within a wide range depending upon such factors as the intended use of the resultant composition, the nature of the reactive diluent, the nature and weight average molecular weight of the oligomers and/or polymers, and the like. As general guidelines ink jettable fluid compositions may include up to about 30 weight percent, preferably up to about 20 weight percent of polymer species. Oligomer species may comprise up to about 50 weight percent, preferably up to about 40 weight percent of the composition. More preferably for ink jet applications in which a low viscosity is required, the amount of higher molecular weight constituents is preferably less than about 10 weight percent of the total composition.

The oligomers and/or polymers themselves may be straight-chained, branched, and/or cyclic. Branched oligomers and/or polymers are preferred in that such materials tend to have lower viscosity than straight-chain counterparts of comparable molecular weight.

High molecular weight species suitable in the practice of the present invention may be aliphatic polyurethanes, acrylics, polyesters, polyimides, polyamides, epoxy polymers, polystyrene (including copolymers of styrene) and substituted styrenes, silicone containing polymers, fluorinated polymers, combinations of these, and the like. For outdoor applications, polyurethane and acrylic-containing oligomers and/or polymers are preferred due to the tendency of these materials to have excellent durability and weatherability characteristics. Such materials also tend to be readily soluble in reactive diluents formed from radiation curable, (meth)acrylate functional monomers.

Because aromatic constituents of oligomers and/or polymers generally tend to have poor weatherability and/or poor resistance to sunlight, aromatic constituents are preferably limited to less than 5 weight percent, preferably less than 1 weight percent, and more preferably are substantially excluded from both the oligomers and/or polymers and the reactive diluents of the present invention. Accordingly, straight-chained, branched and/or cyclic aliphatic and/or heterocyclic ingredients are preferred for forming oligomers and/or polymers to be used in outdoor applications.

Suitable radiation curable oligomers and/or polymers for use in the present invention include, but are not limited to, (meth)acrylated urethanes (i.e., urethane (meth)acrylates), (meth)acrylated epoxies (i.e., epoxy (meth)acrylates), (meth)acrylated polyesters (i.e., polyester (meth)acrylates), (meth)acrylated (meth)acrylics, (meth)acrylated silicones, (meth)acrylated polyethers (i.e., polyether (meth)acrylates), vinyl (meth)acrylates, and (meth)acrylated oils.

Preferred (meth)acrylated aliphatic urethanes are di(meth) acrylate esters of hydroxyl terminated NCO extended aliphatic polyesters or aliphatic polyethers. (Meth)acrylated polyesters are the reaction products of (meth)acrylic acid with an aliphatic dibasic acid/aliphatic diol-based polyester. Examples of commercially available (meth)acrylated urethanes and polyesters include those known by the trade designations PHOTOMER (Henkel Corp. of Hoboken, N.J.).; EBECRYL 284, 810, 4830, 8402, 1290, 1657, 1810, 2001, 2047, 230, 244, 264, 265, 270, 4833, 4835, 4842, 4866, 4883, 657, 770, 80, 81, 811, 812, 83, 830, 8301, 835, 870, 8800, 8803, 8804 (UCB Radcure Inc. of Smyrna, Ga.); SARTOMER CN series CN964 B-85, CN292, CN704, CN816, CN817, CN818, CN929, CN944B-85, CN945A-60, CN945B-85, CN953, CN961, CN962, CN963, CN 965, CN966, CN968, CN980, CN981, CN982, CN983, CN984, CN985 (Sartomer Co. of Exton, Pa.); ACTILANE (Akcross Chemicals of New Brunswick, N.J.); and UVITHANE (Morton International of Chicago, Ill.).

Preferred acrylated acrylics are acrylic oligomers or polymers that have reactive pendant or terminal (meth)acrylic acid groups capable of forming free radicals for subsequent reaction. Examples of commercially available (meth) acrylated acrylics include those known by the trade designations EBECRYL 745, 754, 767, 1701, and 1755 from UCB Radcure Inc., Smyrna, Ga. Other examples include polymers available under the trade designations ELVACITE 2014 (ICI Acrylics, Inc,. Wilmington, Del.); JONCRYL 587 (S.C. Johnson, Racine, Wis.); and ACRYLOID B series and PARALOID B series such as PARALOID B-60 (Rohm & Haas Co., Philadelphia, Pa.).

Another particularly preferred class of radiation curable, urethane oligomers are described in Assignee's co-pending U.S. patent application in the names of James Carlson et al. titled "INKS AND OTHER COMPOSITIONS INCORPORATING LOW VISCOSITY, RADIATION CURABLE, POLYESTER URETHANE OLIGOMER", filed Nov. 9, 2000, identified by U.S. Ser. No. 09/711346, the entire disclosure of which is incorporated herein by reference. These radiation curable, urethane oligomers are generally characterized by atypically low viscosity characteristics, have a relatively high urethane content, are very economical to manufacture, and are compatible with a wide range of porous and nonporous substrates.

Optionally, any of the radiation curable monomers, oligomers and/or polymers of the present invention may include functionality to help enhance the performance of the fluid compositions of the present invention. For example, these materials may include radiation curable functionality to allow these materials to co-crosslink with the reactive diluent and/or with the surface modified nanoparticles upon exposure to a suitable energy source. To allow the high molecular weight species to form an interpenetrating polymer network with the reactive diluent, high molecular weight species may include a different kind of crosslinking functionality such as pendant hydroxyl groups or the like. In the presence of an isocyanate crosslinking agent, pendant hydroxyl moieties will undergo urethane crosslinking reactions with the NCO groups of the isocyanate crosslinking agent to form a crosslinked network comprising urethane linkages. To help disperse optional additives such as pigment colorants, inorganic powder fillers, and the like, high molecular weight species may comprise pendant dispersant moieties, such as acid or salt moieties of sulfonate, phosphate, phosphonate, carboxylate, polar heterocyclic, (meth)acrylonitrile, and/or the like.

As additional components of compositions of the present invention, one or more other ingredients may be incorporated into compositions of the present invention in accordance with conventional practices. These optional additives include one or more of solvent, photoinitiators, gloss modifiers, dyes, pigments, slip modifiers, antifoaming agents, flow or other rheology control agents, waxes, oils, plasticizers, binders, antioxidants, photoinitiator stabilizers, fungicides, bactericides, organic and/or inorganic filler particles, leveling agents, opacifiers, antistatic agents, dispersants, and the like.

The pigment, if used, is generally incorporated into the composition by milling the pigment into all or a portion of the fluid vehicle. If the composition is to be used in combination with a retroreflective backing, the pigment must be milled to a particle size that provides sufficient transparency to permit retroreflection and provide retroreflective color. This is described in more detail below.

Energy curable ink compositions of the present invention also may optionally incorporate a limited, moderate amount of a solvent component with low surface tension properties. Preferred solvents desirably have a surface tension that is no more than about, and preferably at least about 2 dynes/cm less than, the surface tension of the reactive diluent taken as a whole; provided, however, that the more preferred solvents additionally have a surface tension that is less than about 30 dynes/cm at 25° C., preferably less than about 28 dynes/cm at 25° C., and more preferably less than about 26 dynes/cm at 25° C. The preferred solvents also desirably have a relatively high flash point of at least about 50° C., preferably at least about 60° C.

The compositions desirably include enough solvent to promote the desired level of wetting and adhesion, to reduce the viscosity of the composition to a level suitable for ink jetting applications, to reduce the surface tension of the composition to the necessary level to wet a wide variety of substrates, and/or to provide a vapor barrier that forms over printed compositions in situ during radiation curing to improve the quality of the cure. So long as enough solvent is present to promote one or more of these objectives as desired, using lesser amounts of solvent tends to provide better quality printed features as compared to using greater amounts of solvent. Using more solvent than is needed may also increase the difficulty of drying the printed features during radiation curing and could deteriorate the cured image appearance and properties. As general guidelines, radiation curable ink compositions of the present invention may comprise 0.1 to 40, preferably 0.5 to 15, more preferably 1 to about 10 weight percent of the solvent component.

The solvent component may comprise one or more solvents that may be aqueous or inorganic, polar or nonpolar, or the like. Organic solvents that are polar or nonpolar are more preferred inasmuch as such solvents tend to dry more readily during radiation curing. Preferred organic solvents also promote compatibility with a wide range of polymer substrates by reducing the surface tension of the ink to the desired level. Also, preferred solvents should be compatible with the pigment dispersion so that the solvent does not cause ink instability. As another desirable characteristic, solvents of the present invention are desirably fluids at the print head temperature and undergo substantially no polymerization through free radical polymerization mechanisms when radiation curable components of the formulations are radiation cured.

It can be appreciated, therefore, that a wide range of solvents may be incorporated into the solvent component. Representative examples include water; alcohols such as isopropyl alcohol (IPA) or ethanol; ketones such as methyl ethyl ketone, cyclohexanone, or acetone; aromatic hydrocarbons; isophorone; butyrolactone; N-methylpyrrolidone; tetrahydrofuran; esters such as lactates, acetates, propylene glycol monomethyl ether acetate (PM acetate), diethylene glycol ethyl ether acetate (DE acetate), ethylene glycol butyl ether acetate (EB acetate), dipropylene glycol monomethyl acetate (DPM acetate), iso-alkyl esters, isohexyl acetate, isoheptyl acetate, isooctyl acetate, isononyl acetate, isodecyl acetate, isododecyl acetate, isotridecyl acetate or other iso-alkyl esters; combinations of these and the like.

Esters, particularly those comprising branched aliphatic moieties such as iso-alkyl moieties, are one class of preferred solvents. These solvents provide numerous advantages when incorporated into radiation curable ink jet inks. First, these solvents are compatible with all of the nonporous, polymeric substrates currently in widespread use in the sign making industry. The materials are also excellent solvents for the radiation curable monomers, oligomers, and polymers. Uniquely, these materials evaporate very easily, yet have relatively high flash points. Thus, these solvents are easily removed during radiation curing, yet do not significantly reduce the formulation flash point. Ink compositions including these solvents also have very favorable dot gain characteristics. A variety of branched, aliphatic ester solvents are commercially available under the trade designation "EXXATE" from ExxonMobil Corp. of Irving, Tex.

In preferred embodiments, relatively polar solvents such as isopropyl alcohol are less desirable than relatively nonpolar solvents in that polar solvents may have a strong affinity for the dispersants, if any, used to stabilize the pigment in the inks. This affinity can cause pigment agglomeration and ink destabilization. Solvents with static surface tension at 25° C. of greater than about 30 dynes/cm also are less preferred.

The use of moderate amounts of solvent in energy curable formulations has been further described in Assignee's co-pending application filed Nov. 9, 2000, for "INKS AND OTHER COMPOSITIONS INCORPORATING LIMITED QUANTITIES OF SOLVENT ADVANTAGEOUSLY USED IN INK JETTING APPLICATIONS", in the names of Ylitalo et al., having U.S. Ser. No. 09/711,345, the entirety of which is incorporated herein by reference.

In a preferred mode of the invention, the inks are cured using UV radiation, which desirably may require the presence of at least one photoinitiator. The type of photoinitiator used depends on the choice of colorant in the ink and on the wavelength of the radiation. Examples of suitable photoinitiators are listed in PCT Patent Publication WO 00/20521 A1.

Commercially available free-radical generating photoinitiators suitable for the invention include, but are not limited to benzophenone, benzoin ether and acylphosphine photoinitiators such as those sold under the trade designations IRGACURE and DAROCUR from Ciba Specialty Chemicals Corp. of Tarrytown, N.Y.). In addition, the colorant in the ink will absorb part of the incident radiation, depleting the available energy to activate the photoinitiator(s). This will slow down the curing rate and may result in poor through and/or surface cure of the applied ink. It is therefore preferred to use a mixture of photoinitiators in order to provide both surface and through cure. The amount of photoinitiator(s) used typically varies between 1 and 15% and preferably between 3 and 12% and more preferably between 5 and 10% for formulations containing colorant. The uncolored inks can have lower initiator concentrations. Co-initiators and amine synergists can be included in order to improve curing rate. Examples include isopropylthioxanthone, ethyl 4-(dimethylamino)benzoate, 2-ethylhexyl dimethylaminobenzoate, and dimethylaminoethyl methacrylate.

In addition or as an alternative to photoinitiators, other kinds of initiators may also be used. For example, useful cationic photoinitiators comprising onium salts have the general structure A-X wherein A is an organic cation selected from diazonium, iodonium, and sulfonium cations, more preferably A is selected from diphenyliodonium, triphenylsulfonium and phenylthiophenyl diphenyl sulfonium; and X is an anion, the counterion of the onium salts in which X is an organic sulfonate, or halogenated metal or metalloid. Particularly useful onium salts include, but are not limited to, aryl diazonium salts, diaryliodonium salts, and triarylsulfonium salts. Additional examples of the onium salts are described in U.S. Pat. No. 5,086,086 at col.4, lines 29–61.

Thermal free-radical initiators useful in the present invention include, but are not limited to azo, peroxide, and redox initiators. Suitable thermal initiators are to be chosen so as to not prematurely initiate the polymerization during storage, in the ink reservoir, or in the print head. Preferably, the activation temperature for the initiator is above the temperatures that the ink composition is exposed to during storage, in the ink reservoir and the printhead. Once printed, the ink composition can be heated to the appropriate temperature to activate the initiator and trigger the polymerization. Suitable azo initiators include, but are not limited to 2,2'-azobis(isobutyronitrile) (VAZO 64), 2,2'-azobis(2-methylbutyronitrile)(VAZO 67), 1.1'-azobis (1-cyclohexadecanecarbonitrile) (VAZO 88), all of which are available from DuPont Chemicals.

Suitable peroxide initiators include, but are not limited to, benzoyl peroxide, lauroyl peroxide, and dicumyl peroxide. Suitable redox initiators include, but are not limited to, combinations of the above listed peroxides plus reducing arnines such as tertiary amines; and the like.

Crosslinking enhancement may be desired, particularly when it is desired to increase the cohesive strength of the resultant cured material without unduly affecting its compliance. This can be achieved by utilizing a suitable crosslinking agent in conjunction with the initiator. Useful crosslinking agents include benzophenones, anthraquinones, substituted triazines such as 2,4,-bis(trichloromethyl)-6-(4-methoxyphenyl)-s-triazine, 2,4-bis(trichloromethyl)-6-(3,4-dimethoxyphenyl)-s-triazine, and the chromophore-substituted halo-s-triazines disclosed in U.S. Pat. Nos. 4,329,384 and 4,330,590 (Vesley) incorporated herein by reference. Other useful crosslinking agents include multifunctional alkyl acrylate monomers such as trimetholpropane tri(meth)acrylate, pentaerythritol tetra(meth)acrylate, 1,2-ethylene glycol di(meth)acrylate, 1,4-butanediol di(meth)acrylate, 1,6-hexanediol di(meth)acrylate, and 1,12-dodecanol di(meth)acrylate. Various other crosslinking agents include multifunctional vinyl ethers.

Typically, any crosslinker, if present, is in an amount of from about 0.005 up to about 1 weight percent based on the total weight of the energy curable materials, more preferably from about 0.01 to about 0.5 weight percent.

The compositions of the present invention may be made using a wide range of methodologies. According to one approach, the desired inorganic oxide particles are first surface modified. Surface modification of inorganic particles can be carried out in water or in a mixture of water and one or more co-solvents depending on the particular surface treatment agent used. Surface modification can be conveniently performed at or below about 45 weight percent inorganic particles, preferably 15 to 25 weight percent inorganic particles. The starting colloidal dispersion can be diluted with water and/or co-solvent such as an alcohol or the like to obtain the desired inorganic particle content. Alcohols such as ethanol, isopropyl alcohol, methoxy-2-propanol, and the like are preferred as the co-solvent. The co-solvent may be used in a wide range of amounts in order to help solubilize components of the composition and to assist with water removal. For example, using about 1 to 2 parts by weight of co-solvent per 1 part by weight of the starting colloidal dispersion of inorganic particles would be suitable.

The weight ratio of surface treatment agent to inorganic particles necessary to achieve good coverage, preferably substantially monolayer coverage, depends on factors such as the molecular weight of the surface treatment agent and the particle size and chemical composition of the colloids. For example, 20 nm silica particle requires about 0.6 mMole silane per gram of silica, whereas 75 nm silica particles require about 0.16 mMole silane per gram of silica.

The surface treatment agents will reactively attach to the surfaces of the particles. The resultant surface treated particles will have surface components in relative amounts and character corresponding to the surface treatment agents that were used. The ingredients are allowed to stand for a time sufficient to allow this reaction to occur. From 1 to about 48 hours, preferably about 20 hours would be suitable. The ingredients may be heated and maintained at an elevated temperature, e.g., at a temperature from about 35° C. to about 95° C., during this time to facilitate the reaction.

The resultant colloidal dispersion of surface modified particles, the desired fluid vehicle, and other optional ingredients of the composition may then be combined and mixed thoroughly to obtain a homogeneous dispersion. Enough fluid vehicle is used such that the combination has about 5 to 50, preferably 15 to 40 weight percent of particles (exclusive of the surface treatment agents) per 100 parts by weight of the binder precursor. The other additives are used in amounts in accordance with conventional practices. Solvent(s) is/are then removed, if necessary, until the composition has the desired amount of solvent. For radiation curable compositions, preferably the solvent is removed such that the composition is at least substantially solvent-free. Solvent may be removed using any suitable technique.

When pigment colorants are to be included in the compositions, a preferred processing approach involves predispersing and/or pre-milling the colorant pigments in the vehicle fluid before the fluid is combined with the surface modified particles. Preferably, this predispersion and/or pre-milling is carried out such that the pigment particle size of the colorant is less than 5 micrometers, preferably less than 1 micrometer, ideally less than 0.5 micrometers.

The compositions of the present invention may be applied in any suitable fashion onto a receiving substrate such as wood, metal, paper, woven or nonwoven fabrics, resin-coated paper, foil, polymer articles, polymer films, and the like. Representative examples of coating techniques include screen printing, spraying, ink jet printing, gravure coating, knife coating, brushing, curtain coating, flexography and the like. The compositions of the present invention may be used to form graphic elements, text items, continuous layers, bar codes, or other features.

Compositions of the present invention are highly compatible with both porous and nonporous substrates. The compatibility with nonporous materials allows these compositions to be applied onto a wide range of nonporous polymer films, including single and multilayer constructions comprising films of poly(vinyl chloride) (including vinyl, plasticized vinyl, reinforced vinyl and vinyl/acrylic blends), polybutylene terephthalate, polyethylene terephthalate, other polyester, acrylonitrile-butadiene-styrene copolymer, polystyrene, high impact polystyrene, polycarbonate, polyurethane, epoxy, polyimide (including copper and/or gold coated polyimide), polyamide, polymethyl(meth) acrylate, modified polyolefin, polyamideimide, polyacrylate, polyacrylamide, melamine resins, polyvinyl butyral and its copolymers, combinations of these, and the like. Because radiation curing generates little if any heat, the compositions of the present invention may be used on heat-sensitive substrates as well.

After being coated, preferred radiation curable compositions may be cured using a suitable fluence and type of curing energy. The amount of curing energy to be used for curing depends upon a number of factors, such as the amount and the type of reactants involved, the energy source, web speed, the distance from the energy source, and the thickness of the material to be cured. Generally, the rate of curing tends to increase with increased energy intensity. The rate of curing also may tend to increase with increasing amounts of catalyst and/or initiator being present in the composition. As general guidelines, actinic radiation typically involves a total energy exposure from about 0.1 to about 10 joule/cm$^2$, and electron beam radiation typically involves a total energy exposure in the range from less than 1 to 100 megarads or more, preferably 1 to 10 megarads. Exposure times may be from less than about I second up to 10 minutes or more. Radiation exposure may occur in air or in an inert atmosphere such as nitrogen or $CO_2$.

After coating, any solvents present in radiation curable compositions of the invention, if any, may be flashed off with heat. Alternatively, if only a moderate amount of solvent is present, the solvent may be removed at the same time that radiation curing is carried out. Substantially simultaneously radiation curing and drying enhances the quality of curing as described Assignee's co-pending patent application Ser. No. 09/711,345 also referred to above.

Radiation curable, ink jettable embodiments of the present invention tend to have sufficiently low viscosity properties, at least when being jetted through the nozzles of an ink jet print head, so that the fluid compositions advantageously may be applied to receiving substrates using ink jetting techniques. Preferably, at least while being jetted, compositions of the present invention have a viscosity of below about 30 mPa·s, preferably below about 25 mPa·s, more preferably below about 20 mPa·s at the desired ink jetting temperature (i.e., from ambient temperature up to about 80° C.) and shear conditions.

However, the optimum viscosity characteristics for a particular composition will depend upon the type of ink jet system that will be used to apply the composition onto the substrate. For example, for piezo ink jet applications, a typical desired viscosity is about 3 to about 30 mPa·s at the print head temperature. Generally, this means that the fluid compositions preferably have a viscosity at 25° C. of up to about 50 mPa·s. Particularly preferred embodiments of the inks described herein tend to have viscosities in this range of 10 to 16 mPa·s at moderate temperatures of 25° C. to about 65° C.

Such viscosity characteristics generally help to ensure that the composition will be jettable at the desired print head temperature. Due to potential volatility and reactivity of one or more constituents of the radiation curable compositions, the fluid compositions preferably are jetted at temperatures no higher than about 80° C., and more preferably no higher than about 50° C.

As another preferred characteristic that is desirable for ink jetting applications, fluid compositions of the present invention desirably have moderate to low surface tension properties. Preferred formulations have a surface tension in the range of from about 20 dynes/cm to about 50 dynes/cm, more preferably in the range of from about 22 dynes/cm to about 40 dynes/cm at the printhead operating temperature. Most radiation curable, monomeric constituents (hereinafter referred to as the "reactive diluent") to be incorporated into the energy curable vehicle of the present invention already have surface tension characteristics in the preferred ranges. Therefore, formulating fluid compositions of the present invention with appropriate surface tension characteristics for ink jet applications is easily accomplished.

Preferred fluid compositions of the present invention also have Newtonian or substantially Newtonian viscosity properties at least while being jetted at the jetting temperature and jetting shear conditions. A Newtonian fluid has a viscosity that is at least substantially independent of shear rate. As used herein, the viscosity of a fluid will be deemed to be substantially independent of shear rate, and hence at least substantially Newtonian, if the fluid has a power law index of 0.95 or greater. The power law index of a fluid is given by the expression $$\eta = m\gamma^{n-1}$$

wherein $\eta$ is the shear viscosity, $\gamma$ is the shear rate in s$^{-1}$, m is a constant, and n is the power law index. The principles of the power law index are further described in C. W. Macosko, "Rheology: Principles, Measurements, and Applications", ISBN #1-56081-579-5, page 85.

For ink jet applications, substantially Newtonian characteristics at least while being jetted are especially preferred over non-Newtonian fluids that exhibit elastic behavior. Elasticity of a fluid tends to cause extension thickening behavior, which is known to prevent jetting of inks, even when the low viscosity requirement is satisfied. Another reason for using fluids with at least substantially Newtonian viscosity properties is that jetting is typically achieved at shear rates of approximately $1 \times 10^6$ s$^{-1}$, while ink refill from the reservoir into the ink jet head channels takes place at 100–1000 s$^{-1}$. A highly elastic composition will have much higher viscosity at the refill rate than at the jetting rate. This tends to slow refill, compromising printhead performance. Elasticity and its drawbacks can be avoided by formulating fluid compositions that exhibit little or no elasticity at the jetting temperature and shear conditions.

The method of the invention advantageously utilizes an ink-jet printer to apply inks and form ink jetted features, e.g., films or patterns, on the desired substrate. Various types of ink-jet printers are known, including thermal inkjet printers, continuous inkjet printers, and piezoelectric inkjet printers (i.e., piezo inkjet). Thermal inkjet printers and printheads are readily commercially available from printer manufacturers such as Hewlett-Packard Corp. of Palo Alto, Calif., USA; Lexmark International of Lexington, Ky., USA and others. Embodiments of ink jet printing devices with versatile printing capabilities are also described in Assignee's co-pending application titled "MULTIPLE RESOLUTION FLUID APPLICATOR AND METHODS", filed Dec. 29, 2000, and bearing Attorney Docket No. 55361USA5A.

In order to prevent premature curing of the compositions, the method of the invention preferably employs a piezoelectric ink-jet printer. Piezo inkjet print heads are commercially available from Trident International, Inc. of Brookfield, Conn.; U.S. Epson Inc. of Torrance, Calif., USA; Hitachi Data Systems Corp. of Santa Clara, Calif., USA; Xaar Ltd. of Cambridge, United Kingdom; Spectra, Inc. of Hanover, N.Y., USA; Idanit Technologies, Ltd. of Rishon Le Zion, Israel; and others. Such print heads are used in piezo inkjet printers commercially available from Idanit Technologies, Ltd. of Rishon Le Zion, Israel; Raster Graphics, Inc. of San Jose, Calif., USA; Vutek, Inc. of Meredith, N.H., USA; and Olympus Optical Co. Ltd. of Tokyo, Japan, and others.

The present invention will now be further described with reference to the following illustrative examples, in which the following abbreviations are used:

"wt %" means weight percent, "TGA" means thermal gravimetric analysis, "RT" refers to room temperature, "NM" means not measured, "liq" means fluid, "ps" means phase separated, "sv" means slightly viscous, "nv" means non-viscous fluid, "lv" means low viscosity fluid, "mv" means medium viscosity fluid, "hv" means high viscosity fluid, "sh" means slightly hazy, "v" means viscous, "vl" means viscous fluid, "h" means hazy.

"2-EHA" refers to 2-ethylhexyl acrylate available from BASF Corp. of Mount Olive, N.J.

"A-174" refers to SILQUEST A-174 which is gamma-methacryloyloxypropyltrimethoxysilane available from OSI Specialties Inc. of Endicott, N.Y.

"IOTMS" refers to isooctyltrimethoxysilane (also known as trimethoxy(2,4,4-trimethylpentyl)silane) having the trade designation BS 1316 available from Wacker Silicones Corporation of Adrian, Mich.

"PEG2TES" refers to N-(3-triethoxysilylpropyl) methoxyethoxyethyl carbamate. It was prepared as follows: A 250 ml round-bottomed flask equipped with a magnetic stir bar was charged with diethylene glycol methyl ether (35 g) and methyl ethyl ketone (77 g). A majority of the solvent was removed via rotary evaporation to remove water. 3-(Triethoxysilyl)propylisocyanate (68.60 g) was charged to the flask. Dibutyltin dilaurate (~3 mg) was added and the mixture stirred. The reaction proceeded with a mild exotherm. The reaction was run for approximately 16 hr at which time infrared spectroscopy showed no isocyanate. The remainder of the solvent and alcohol were removed via rotary evaporation (90° C.) to yield PEG2TES as a somewhat viscous fluid (104.46 g).

"PEG3TMS" refers to N-(3-triethoxysilylpropyl) methoxyethoxyethoxyethyl carbamate. It was prepared according to the procedure for preparing PEG2TES except that an equimolar amount of tri(ethylene glycol) methyl ether was substituted for di(ethylene glycol) methyl ether.

"NOA" refers to N-octylacrylamide available from National Starch and Chemical Company, of Bridgewater, N.J.

"IBA" refers to isobornyl acrylate, "EEEA" refers to 2-ethoxyethoxyethyl acrylate, "HDDA" refers to 1,6-hexanediol diacrylate, "LA" refers to lauryl acrylate and "IOA" refers to isooctyl acrylate. All are available from Sartomer Company of Exton, Pa.

"EBECRYL 8402" a trade name for an aliphatic urethane diacrylate having 1000 molecular weight and a viscosity of 200 mPa·s at 65.5° C. "EBECRYL 810" is a trade name for a polyester tetraacrylate having 1000 molecular weight and a viscosity of 500 mPa·s. "EBECRYL 4830" is a trade name for an aliphatic urethane diacrylate diluted 10% with tetraethylene glycol diacrylate and having 1200 oligomer molecular weight and a viscosity of 3500 mPa·s at 60° C. All are available from UCB Chemicals Corp. of Smyrna, Ga., USA.

"MICROLITH C-K" is a trade name for black pigment chip. "IRGACURE 651" is a trade name for benzil dimethyl ketal. "IRGACURE 819" is a trade name for bis(2,4,6-trimethylbenzoyl)phenylphosphine oxide. "IRGACURE 184" is a trade name for 1-hydroxycyclohexyl phenyl ketone. All are available from Ciba Specialty Chemicals of Tarrytown, N.Y., USA.

906 ABRASION RESISTANT COATING (48–53 parts isopropyl alcohol, 13–18 parts methacrylic-functionalized silica, 12–17 parts pentaerythritol tetraacrylate, 5–7 parts other acrylic esters, 3–6 parts pentaerythritol triacrylate, 2–5 parts N,N-dimethylacrylamide, 1–2 parts 1-hydroxycyclohexyl phenyl ketone (IRGACURE 184), <1 part bis(1,2,2,6,6-pentamethyl-4-piperidinyl) sebacate) is a curable acrylic resin available from 3M Company of St. Paul, Minn., USA.

"AA" refers to acrylic acid. "HEMA" refers to hydroxyethyl methacrylate. All are available from standard chemical vendors such as Aldrich Chemical Company of Milwaukee, Wis.

"beta-CEA" refers to the trade name "SIPOMER" beta-carboxyethyl acrylate available from Rhone-Poulenc Surfactants and Specialties of Cranbury, N.J.

"SANTICIZER 141" a trade designation for 2-ethylhexyl diphenyl phosphate, a plasticizer from Monsanto Co. of St. Louis, Mo.

"NALCO 2327" a trade designation for colloidal silica (41.5% by weight SiO2) available from Nalco Chemical of Naperville, Ill.

"MIPA" refers to 1-methoxy-2-propanol, methyl ethyl ketone and other materials used in the examples, but not specifically listed herein are available from standard chemical vendors such as Aldrich Chemical Co. of Milwaukee, Wis.

"EFKA 4046" a trade designation for a high molecular weight polyurethane dispersants available from Lubrizol Corp. of Wickliffe, Ohio.

Thermal gravimetric analyses were conducted on a model TA 2940 thermal gravimetric analyzer from TA Instruments of New Castle, Delaware. The samples were equilibrated at 80° C. and ramped up to 200° C. at 20° C./min. Samples were held at 200° C. for 20 min then ramped up to 900° C. at 20° C./min. Silica content is the weight remaining at 900° C.

Unless otherwise specified all parts, percentages and ratios used in the examples that follow are based on weight.

EXAMPLE 1

Preparation of Composition 1

NALCO 2327 (300 g) was charged to 0.9 Liter jar. MIPA (337 g), 7.11 g PEG2TES, and 14.5 g A-174 were mixed together and added to the colloidal dispersion with swirling. The jar was sealed and heated to 80° C. for 20 hr, resulting in a clear and slightly blue tinted nonviscous colloidal dispersion (Colloidal Dispersion A).

A monomer mixture was prepared by combining 31.5 parts LA, 55.7 parts IBA and 12.8 parts NOA. A 1-Liter round-bottomed flask was charged with the 300.88 g of the colloidal dispersion, and 199.69 g of the monomer mixture. Water and alcohol were removed via rotary evaporation followed by trap to trap distillation. A clear thermoreversible gel was obtained (Composition1). Thermogravimetric analysis showed it to be 21.44 wt. % silica.

The rheology of the thermally reversible gels was studied by a Steady State Stress Sweep test between 25° C. to 70° C. using a Rheometric RS-200 controlled stress rheometer with the cup and bob geometry (available from Rheometric Scientific, Inc. of Piscataway, N.J.). FIG. 1 is a plot of the colloidal dispersion viscosity versus shear stress at several temperatures. FIG. 1 shows the transition from a solid-like behavior with a well defined yield stress at lower temperatures to low viscosity Newtonian fluid behavior at higher temperatures. Newtonian viscosities of 6 mPa·s and 9 mPa·s were measured for the colloidal dispersion at 65° C. and 60° C. respectively. As the temperature decreased from 60° C. the sample viscosity increased and became more shear thinning. At 50° C., the sample started to show solid-like characteristics as indicated by the viscosity plateau at low shear stress. Increasing the shear stress from the viscosity plateau region resulted in a precipitous decrease in viscosity as the material yields. Further, lowering the temperature resulted in a larger solid state plateau and higher yield stress. At room temperature, the sample showed a yield stress of 7 Pa. At all the temperatures once the yield stress is exceeded, all gels exhibited a low viscosity fluid behavior.

Jetting of Composition 1

Composition 1 was jetted using a PIXELJET piezo inkjet printhead (available from Trident International, Inc. of Brookfield, Conn.) with 64 channels at 4 KHz. The jetting temperature was varied from 50° C. to 65° C., the driving voltage was varied from 35–45 V, and the pulse width was varied from 10–20 microseconds. Viscosity was measured by Rheometric Dynamic Stress Rheometer SR-200 (available from Rheometric Scientific, Inc. of Piscataway, N.J.), taken at 695 $s^{-1}$ shear rate, and drop velocity was measured at 90 microseconds after jetting. The results are shown in Table 1.

TABLE 1

| Temperature (° C.) | Viscosity (mPa · s) | Voltage (V) | Pulse width (microsecond) | Drop velocity (m/s) |
|---|---|---|---|---|
| 55 | 10 | 40 | 16 | 8.96 |
| 60 | 7.8 | 40 | 16 | 10.62 |
| 65 | 5.6 | 40 | 16 | 11.05 |
| 60 | 7.8 | 35 | 16 | 8.56 |
| 60 | 7.8 | 40 | 16 | 10.62 |
| 60 | 7.8 | 45 | 16 | 12.91 |
| 55 | 10 | 50 | 16 | 11.96 |
| 60 | 7.8 | 40 | 10 | 6.39 |
| 60 | 7.8 | 40 | 12 | 8.84 |
| 60 | 7.8 | 40 | 14 | 10.37 |
| 60 | 7.8 | 40 | 16 | 10.47 |
| 60 | 7.8 | 40 | 18 | 10.21 |
| 60 | 7.8 | 40 | 20 | 8.79 |

Composition 1 was successfully jetted with a high velocity of 9–11 meter/second between 55° C. and 65° C. The gel did not jet at 50° C., at which point the material showed solid like structure at low stress from rheology measurement.

EXAMPLE 2

Nanoparticle containing gels are jetted as fluids at elevated temperatures, but undergo rapid gelation upon contact with a room temperature substrate. This example shows that reduced spreading of the drops and formation of well defined lines when printing on non-porous substrates is observed with compositions of the invention.
Preparation of Composition 2
  Composition 1 (99 g) was combined with 1 part IRGACURE 184 (Composition 2).
Preparation of Composition 3 (comparative)
  As a comparison, a solution was prepared from 99 wt. % of a mixture of 189 g LA, 334 g IBA and 73.8 g NOA, and 1 wt. % IRGACURE 184 photoinitiator.
Jetting of Compositions 2 and 3
  Compositions 2 and 3 were printed on polymethyl methacrylate film, 0.089 mm thickness, available from 3M Company of St. Paul, Minn.) using the jetting conditions of Example 1. For each composition, a pair of parallel lines was printed in one test. A pair of intersecting lines was also printed for each composition. The jetted samples were cured using a UV processor (obtained from RPC Industries) having a medium pressure mercury lamp with an intensity of 0.349 Joule/$cm^2$, and operating at a web speed of 15.2 meter/minute with nitrogen atmosphere. The print lines for the nanocomposite gel were much smoother, with precise line edges and were substantially more well defined than for the comparative. The width of the lines for the nanocomposite gel were also very uniform, with very little variation. By contrast, the comparative line edges undulated more, causing the line width to vary much more than with the gel composition. The line width of the gel was 137 micrometers, and for the comparative was around 150–160 micrometers. The gel could also print two lines on top of one another that gave a clean intersection (without curing), whereas the corresponding two fluid lines coalesced and formed a blob at the point of crossing.

Jetting Compositions 2 and 3 to build thickness
  This example further demonstrates that much higher printing thickness may be achieved using compositions of the invention than with comparative fluid materials. Compositions 2 and 3 were individually jetted onto polyester film using a Trident PIXEL JET printhead with 64 channels and operating at 4KHz. The samples were jetted at 60° C. using a 16 microsecond pulse width. The print height was measured by confocal microscopy (confocal brightfield (CRB) (x,z), 20×/0.45, 50×/0.90 objectives). Results are shown in Table 2.

TABLE 2

| | First Printing Pass | Second Printing Pass | Third Printing Pass | Fourth Printing Pass |
|---|---|---|---|---|
| Composition 2 | | | | |
| Height (micrometers) | 5.08 | 10.99 | 14.51 | 18.31 |
| Width (micrometers) | 119.92 | 144.53 | 175 | 268 |
| Composition 3 | | | | |
| Height (micrometers) | not measurable | 1.9 | 3.9 | Not measured |

EXAMPLE 3

Preparation of Composition 4
  NALCO 2327 (400 g) was charged to 0.9 Liter jar. MIPA (449 g), 9.56 g PEG2TES, and 19.43 g A-174 were mixed together and added to the colloidal dispersion with swirling. The jar was sealed and heated to 80° C. for 22 hr. This resulted in a clear blue nonviscous colloidal dispersion of modified silica (Colloidal Dispersion B).
  A monomer mixture 87.5 parts IBA and 12.5 parts NOA was prepared. A 1-Liter round-bottomed flask was charged with the 250.25 g Colloidal Dispersion B and 109.62 g monomer mixture. Water and alcohol were removed via rotary evaporation followed by trap to trap distillation. A clear thermoreversible gel (Composition 4) was obtained (~30 wt. % silica).
Jetting of Composition 4
  Ink jet printing of covercoats or edge dams on electronic microcircuits offers the advantages of direct coating on selected areas, an increase in coating speed and an increased placement accuracy with respect to the current screen printing method. One challenge of the inkjet approach is to ensure that the jetted, low viscosity materials stay in place on the microcircuits. A fluid ink jet ink tends to run along the metal traces due to capillary forces. In contrast, the gel materials of the present invention offer significantly enhanced control over spreading and dot gain and thus are potentially useful for ink jet printing on microcircuits. Composition 4 was printed onto an integrated circuit substrate to produce a well-defined edge dam pattern on the substrate.

EXAMPLE 4

Preparation of Compositions 5 and 6:
  NALCO 2327 (200 g) was charged to a 0.9 Liter jar. MIPA (225.48 g), 2.11 g PEG3TMS and 8.84 g IOTMS were mixed together and added to the colloidal dispersion with swirling. The jar was sealed and heated to 80° C. for 24 hr resulting in a viscous colloidal dispersion.
  A 1-Liter round-bottomed flask was charged with the 112.0 g of the colloidal dispersion and 63.16 g IOA. The water and alcohol were removed via rotary evaporation followed by trap to trap distillation. A hazy somewhat viscous colloidal dispersion was obtained (Colloidal Dispersion C). Two colloidal dispersions were made from this material.

A portion of the hazy somewhat viscous colloidal dispersion (20 g) was mixed with 1.24 g beta-CEA and 0.58 g acrylic acid to obtain a somewhat clear gel which was hazy blue colored (Composition 5), 24 wt. % silica nanoparticles. The gel changed to a fluid upon vigorous shaking or heating to 75° C.

Composition 6 having a lower silica content was made by combining 19.79 g Colloidal Dispersion C with 27.5 g IOA, 1.7 g beta-CEA and 0.823 g AA resulting in a translucent gel at room temperature (16 wt. % silica particles).

Jetting of Compositions 5 and 6

Compositions 5 and 6 were jetted at 80° C. using a Trident MICROCODER piezo inkjet printhead (available from Trident International, Inc. of Brookfield, Conn.) with 50 micrometers orifices. Operating conditions were: P=−5.8, V1=0, V2=−100, T1=100 microsecond, T2=70 microsecond). Composition 5 was barely jettable at 80° C., but more consistently jetted when the temperature was raised to 100° C. The materials had to be periodically purged from the printhead due to the air bubbles present in the samples. Silica content of both samples remained constant before and after jetting as determined by TGA. The cured materials had significant tack.

EXAMPLE 5
Preparation of Composition 7

NALCO 2327 (300 g) was charged to 0.9 Liter jar. MIPA (337 g), 14.5 g A-174 and 7.11 g PEG2TES were mixed together and added to the colloidal dispersion with swirling. The jar was sealed and heated to 80° C. for 20 hr resulting in a clear blue nonviscous colloidal dispersion (Colloidal Dispersion D).

A monomer mixture of 45.5 parts LA, 34.7 parts IBA and 19.8 parts NOA was prepared. A 250-ml round-bottomed flask was charged with 98.3 g Colloidal Dispersion D and 65.9 g of the monomer mixture. The water and alcohol were removed via rotary evaporation followed by trap to trap distillation. A clear gel was obtained having a silica content of 22.47 wt. %. SANTICIZER 141 plasticizer was added to this gel in an amount of 20 wt. % of the total and mixed in along with 0.015 wt. % of the total IRGACURE 651 photoinitiator (Composition 7).

Jetting of Composition 7

Composition 7 was added to a Trident MICROCODER piezo inkjet ink reservoir and degassed for 2 hours at 50° C. The formulation was then heated to 65° C. and successfully printed onto a polyethylene terephthalate substrate using a MICROCODER piezo inkjet print head with 50-micrometers orifices from Trident International, Inc. of Brookfield, Conn. The printed image, which maintained its shape on a vertical substrate, was then exposed for about 5 minutes under 350 nm bulbs (Sylvania F15T8/350 BL available from Osram Sylvania, Inc. of Danvers, Mass.) in a nitrogen atmosphere at a distance from the bulbs of approximately 7 cm resulting in a pressure-sensitive adhesive.

EXAMPLE 6
Preparation of Composition 8

300 g NALCO 2327 was charged to 0.9 Liter jar. MIPA (337 g), 13.47 g IOTES and 7.08 g PEG2TES were mixed together and added to the colloidal dispersion with swirling. The jar was sealed and heated to 80° C. for 20 hrs. This resulted in a clear blue nonviscous colloidal dispersion (Colloidal Dispersion E).

A monomer blend of 96.20 g 2-EHA, 3.70 g NOA and 0.10 part HDDA was prepared. A 500-ml round-bottomed flask was charged with the 100 g Colloidal Dispersion E and the 66.3 g of the monomer blend. The water and the alcohol were removed via rotary evaporation for 45 minutes at 64° C. resulting in a clear blue free flowing fluid (22 wt. % silica content). IRGACURE 651 in an amount of 0.015 wt. % of the total was then added and dissolved into the formulation (Composition 8).

Jetting of Composition 8

Composition 8 was poured into a Trident MICROCODER piezo inkjet printhead fluid reservoir and degassed for 45 min. at 50° C. The formulation was then allowed to cool to 23° C. at which time an image was successfully printed onto a polyethylene terephthalate film using a MICROCODER piezo inkjet printhead with 50-micrometers orifices from Trident International of Brookfield, Conn. The printed image, which maintained its shape, was printed onto a vertically oriented piece of film and exposed for about 5 minutes under 350 nm bulbs as described in Example 5 in a nitrogen atmosphere resulting in a printed, pressure-sensitive adhesive.

EXAMPLE 7
Preparation of Composition 9

A nanocomposite sol was prepared by combining, in a 250 ml round-bottomed flask with stirring, 16.2 parts NALCO 2327 silica sol (41.5 wt. % silica) and 22 parts MIPA resulting in a clear blue sol. IOTMS (1.86 parts), 2.02 parts A-174 and 38 parts MIPA were added to the sol with stirring. The flask was placed on the rotary evaporator and heated (without solvent removal) for 50 min at 82–91° C. At this point, 20 parts IBA was added and vacuum applied. The alcohol and water were stripped off at ~90 mbar and 70° C. The material was further stripped at room temperature and 200 mTorr to obtain a clear colorless sol (Composition 9) having 22 wt. % SiO2 and a Brookfield viscosity of ~100 mPa·s. One wt. % IRGACURE 184 was added as a photoinitiator.

Nanocomposite Gel Characterization

Nanocomposite gels were studied by Tapping Mode Atomic Force Microscopy (Force Modulation of Aperture) using a Digital Instruments Dimension 5000 instrument that was controlled using a NANOSCOPE IIIa controller available from Digital Instruments of Santa Barbara, California. Preparative Composition 2 was compared with well-dispersed silica colloidal dispersions (Composition 9) having the same silica content. Both samples were cured using a UV processor (obtained from RPC Industries) with a medium pressure mercury lamp with an intensity of 0.339 j/cm2, and operating at a web speed of 15.2 meter/min with nitrogen atmosphere. For the gel of the invention, the particle distribution is microscopically inhomogeneous with significant local agglomeration of the particles. By comparison, in well-dispersed systems that do not form thermally reversible gels, the treated silica particles were uniformly distributed.

EXAMPLE 8
Preparation of Compositions 10–13

Compositions 10–13 were the same as Composition 4 except these contained 22 wt. % $SiO_2$. Additionally, each further included a different amount of MIPA, respectively, as noted in Table 3. Composition 11 was identical to Composition 10, but also included some HEMA, also as noted in Table 3.

Table 3 shows how the addition of a small amount of MIPA affects viscosity, yield stress and storage modulus of gel compositions of the invention. When the dispersing medium is relatively hydrophobic, as in Composition 10, the particles prefer interactions between one another and form gels. With addition of MIPA the medium becomes increasingly hydrophilic. Thus, the particles become more compatible with the medium and particle-particle interactions become weaker as a consequence. At a certain point (as in Composition 13) the dispersing medium is hydrophilic enough that the particles prefer to interact with the medium rather than themselves and the material becomes a low viscosity fluid.

TABLE 3

|   | Additives | Gel-fluid transition (° C.) | Viscosity at 55° C. (mPa · s) | Yield stress at 25° C. (Pa) | G' at 25° C. (Pa) |
|---|---|---|---|---|---|
| Composition 10 | 0.22% MIPA | 55 | 25–15.2 | 67 | 2500 |
| Composition 11 | 0.22% MIPA 0.5% HEMA | 50 | 12.2 | 52 | 2700 |
| Composition 12 | 0.97% MIPA | 40 | 7.4 | 39.9 | 550 |
| Composition 13 | 2.2% MIPA | fluid | 17.6 (at 25° C.) | N/A | N/A |

EXAMPLE 9

Preparation of Composition 14

NALCO 2327 (400 g) was charged to 0.9 Liter jar. MIPA (449 g), PEG2TES (9.48 g) and A-174 (19.4 g) were mixed together and added to the colloidal dispersion with swirling. The jar was sealed and heated to 80° C. for 20 hr, resulting in a clear and slightly blue tinted nonviscous colloidal dispersion (Colloidal Dispersion F).

A monomer mixture was prepared by combining 87.2 parts IBA and 12.8 parts 20 NOA. A 1-Liter round-bottomed flask was charged with the 250.15 g of the Colloidal Dispersion F, and 164.9 g of the monomer mixture. Water and alcohol were removed via rotary evaporation followed by trap to trap distillation. A clear thermoreversible gel was obtained (Composition 14). Thermogravimetric analysis showed it to be 22.84 wt. % silica.

Preparation of Composition 15 (comparative) and Composition 16

Composition 15 (comparative) was prepared by mixing 12.8 g NOA, 86.2 g IBA, and 1 part IRGACURE 184.

Composition 16, a gel was prepared from this by mixing 99 g Composition 14 and 1 part IRGACURE 184.

Jetting of Compositions 15 and 16 (comparative)

Composition 15 and Composition 16 each were jetted from a Trident PIXEL JET printhead with 64 channels. The jetting conditions were as follows: frequency =4000 Hz, pulse width =16 microseconds, voltage =44 volts (gel) and 45 volts (control fluid), temperature =65° C. (gel) and 50° C. (control fluid).

Printed pattern (dots or lines) were cured in-line using a fiber optics UV light source so that the printed fluid or gel, as the case may be, cured quickly upon printing (within 0.2 seconds). Printed patterns were also passed through a UV processor (Fusion UV Systems, Inc. of Rockville, Md., Model 6RQN) at 240 mj/cm$^2$ using an H-Bulb in at about air 2 minutes after printing (off-line).

TABLE 4

| Film Type | Composition | Line width (in-line cure, micrometers) | Line width (off-line cure, micrometers) | dot diameter (in-line cure, micrometers) | dot diameter (off-line cure, micrometers) |
|---|---|---|---|---|---|
| 3M CONTROLTAC PLUS GRAPHIC MARKING FILM 180-10 | 16 | 140 | 138 | | |
| | 15 | smeared | smeared | | |
| Polyimide | 16 | 163 | 159 | 130 | 123 |
| | 15 | smeared | smeared | 174 | 247 |
| Copper coated polyimide | 16 | 129 | 133 | 140 | 142 |
| | 15 | smeared | smeared | smeared | smeared |
| 3M SCOTCHLITE 3970 DIAMOND GRADE REFLECTIVE SHEETING | 16 | 111 | 109 | 108 | 109 |
| | 15 | smeared | smeared | 212 | 271 |
| 3M SCOTCHLITE 3870 HIGH INTENSITY GRADE REFLECTIVE SHEETING | 16 | 141 | 138 | | |
| | 15 | smeared | smeared | | |
| 3M SCOTCHLITE 510 REFLECTIVE SHEETING | 16 | 81 | 83 | | |
| | 15 | smeared | smeared | | |

EXAMPLE 10

Preparation of a pigmented of red thermoreversible gel (Composition 17)

A millbase was prepared from the following ingredients: 81.25 g C. I. Pigment Red 179, 81.25 g C.I. Pigment Red 224, 40.63 g EFKA 4046 (dried), 67.03 g HDDA, 286.0 g EEEA, 93.84 g IBA. The EFKA 4046 dispersant was dissolved in the mixture of monomers. The pigments were added to the solution and incorporated by mixing with a Silverson rotor-stator mixer. A Netzsch MINI-ZETA mill (a trade designation for a bead mill available from Netzsch Inc. of Exton, Pa.) was employed using Glen Mills 0.5 mm Yt stabilized, zirconia media. The mill was assembled and charged with 720 g of media and the chamber was filled with the ingredients to be processed. The milling chamber was sealed and the process fluid hopper was filled. Cooling water and drive compressed air were engaged. The mill began to pump fluid at about 1700 rpm agitator speed. Agitator head speed was increased to approximately 2300 rpm and the dispersion flowed through the milling chamber as a low viscosity fluid. The dispersion was processed for 40 minutes and was collected in a jar for storage and use. The average particle size for Example 2a was measured to be 365 nm with a standard deviation of 90 nm measured in tetrahydrofurfuryl acrylate using a Beckman Coulter N4 plus particle analyzer (available from Beckman Coulter of Fullerton, Calif.) at 25° C.

The millbase (0.5 g) was added to 20 g Composition 4. The mixture was stirred with a wooden stick for 2 minutes to mix the millbase with pigment and the nanocomposite solution (Composition 17). This was then put in a 55° C. oven for 30 minutes. The resultant mixture was a low viscosity solution at 55° C. When cooled to room temperature, a thixotropic gel formed.

EXAMPLE 11

Preparation of a cyan pigmented of thermoreversible gel (Composition 18)

NALCO 2327 (400.2 g) was charged to a 0.9 Liter jar. 1-Methoxy-2-propanol (450.21 g), PEG2TES (9.37 g) and A-174 (18.92 g) were mixed together and added to the colloidal dispersion with stirring. The jar was sealed and heated to 80° C. for 17 hr resulting in a clear, blue dispersion of modified silica. The total charge was 0.62 mMole silane/g silica at a A-174/PEG2TES molar ratio of 75/25.

A monomer mixture 83 parts IBA and 17 parts NOA was prepared. A 2-Liter round-bottom flask (large neck) was charged with the above modified sol (702.44 g) and the monomer mixture (237.29 g). Water and alcohol were removed via rotary evaporation until the total solid wt was 620.2 g. The flask was removed and an additional sol charge (166.36 g) and monomer mix (56.18 g) was added. The remaining alcohol and water were removed via rotary evaporation. A clear gel was obtained. The gel contained 35.53 wt. % $SiO_2$ as measured by TGA (Composition 18).

A cyan pigment dispersion was prepared by combining: 33.5 g SPECTRA PACC BLUE 15:4 pigment, 249–3054 pigment and D27008 pigment (trade designations for blue pigments available from Sun Chemicals of Fort Lee, N.J.) in 66.5 g IBA and mixing on a roller mill for 15 hours.

An ink was prepared by combining with mixing 8.909 g IBA, 1.381 g NOA, 21.955 g Composition 17, 5.005 g of the cyan pigment dispersion and 1.170 g IRGACURE 819. The first three ingredients were combined and placed in an 80° C. oven for 30 minutes. The mixture was stirred with a spatula for two minutes to ensure proper mixing. The pigment dispersion was added, and the mixture was stirred until homogeneous. The ink was placed in 80° C. oven for 10 minutes, then IRGACURE 819 was added and stirred until well blended.

The ink viscosity was measured using SR200 controlled stress rheometer from Rheometric Scientific of Piscataway, N.J. The cup and bob geometry was used. The ink had Newtonian viscosity at 70° C. of 10.2 mPa·s.

The ink was coated onto 3M CONTROLTAC PLUS GRAPHIC SYSTEM 180-10 (a trade designation for vinyl film available from 3M Company of St. Paul. Minn.) at 9 micrometers nominal thickness using a wire wound rod, then cured using the RPC processor under an inert atmosphere.

The ink showed 100% adhesion to vinyl with cyan color density of 1.7 as measured by cross hatch method according to ASTM D 3359-95A Standard Test Methods for Measuring Adhesion by Tape Test, Method B.

EXAMPLE 12

This example shows the effect of surface modification and solvent mixture on rheological properties.

Preparation of Composition 19 (intermediate)

NALCO 2327 (400.04 g ) was charged to a 0.9 Liter jar. 1-Methoxy-2-propanol (450.32 g), PEG2TES (14.19) and IOTMS (15.24 g) were mixed together and added to the colloidal dispersion with stirring. The jar was sealed and heated to 80° C. for 17 hr. The total charge was 0.62 mMole silane/g silica at an IOTMS/PEG2TES molar ratio of (62.5/37.8). This resulted in a white slurry of modified silica.

A 1-Liter round-bottom flask was charged with 278.84 g of the slurry and 138.76 g EHA. The water and alcohol were removed via rotary evaporation until the total solid weight was 190.1 g. The flask was removed and an additional sol charge (181.88 g) and monomer mix (90.89 g) was added. The remaining alcohol and water were removed via rotary evaporation. A gray/white somewhat viscous phase separated sol was obtained. The procedure was repeated using a total of 343.1 g modified sol and 52.31 g EHA. The above silica/EHA sols were combined and a total solids content of 30.33 wt. % was measured (Composition 19, intermediate).

Preparation of Composition 20 (intermediate)

NALCO 2327 (400.09 g) was charged to a 0.9 Liter jar. 1-Methoxy-2-propanol (450.33 g), 12.16 g PEG2TES and 16.45 g IOTMS were mixed together and added to the colloidal dispersion with stirring. The jar was sealed and heated to 80° C. for 17 hr resulting in a white slurry of modified silica. The total charge was 0.62 mMole silane/g silica at a IOTMS/PEG2TES molar ratio of 68/32.

A 1-Liter round-bottom flask was charged with the 278.77 g modified silica and 140.24 g EHA. The water and alcohol were removed via rotary evaporation until the total solid weight was 200.96 g. The flask was removed and an additional 231.76 g charge of slurry and 123.31 g monomer charge was added. The remaining alcohol and water were removed via rotary evaporation. A gray/white gel-like material was obtained. The procedure was repeated using a total of 295.29 g slurry and 142.65 g EHA. The above silica/EHA sols were combined and a total solids content of 31.34 wt. % was measured (Composition 20, intermediate).

Preparation of Composition 21, intermediate

NALCO 2327 (400.52 g) was charged to a 0.9 Liter jar. 1-Methoxy-2-propanol (450.53 g), 5.67 g PEG2TES and 20.49 g IOTMS were mixed together and added to the colloidal dispersion with stirring. The jar was sealed and heated to 80° C. for 17 hr resulting in a white slurry of modified silica. The total charge was 0.62 mMole silane/g silica at a IOTMS/PEG2TES molar ratio of 85/15.

A 1-Liter round-bottom flask was charged with 266.42 g slurry and 136.56 g EHA. The water and alcohol were removed via rotary evaporation until the total solid weight was 184.13 g. The flask was removed and an additional charge of 152.02 g slurry and 75.46 g monomer was added. The remaining alcohol and water were removed via rotary evaporation to give a light gray viscous material.

The procedure was repeated using a total of 560.55 g modified sol and 287.8 g EHA. The above silica/EHA sols were combined and a total solids content of 26.44 wt. % was measured (Composition 21, intermediate).

Compositions 19–21 (in 2 g amounts) were charged to a series of 2 dram screw cap vials, respectively, and EHA and/or acrylic acid were added to each obtain the desired EHA/AA weight ratio and silica content in the total composition as shown in Tables 5 through 7. In Tables 5 through 7 if the material did not flow after the vial was tipped upside down it was considered a gel. Gels were ranked 1, 2 or 3 with 1 being the strongest gel.

Table 5 shows the rheological behavior of various compositions as a function of temperature.

TABLE 5

EHA/AA Weight Ratio at 20 wt. % modified silica using Composition 19

| | 100/0 | 97/3 | 95/5 | 92.5/7.5 | 90/10 | 87.5/12.5 | 85/15 | 80/20 | 75/25 |
|---|---|---|---|---|---|---|---|---|---|
| | | | | Composition No. | | | | | |
| | 19a | 19b | 19c | 19d | 19e | 19f | 19g | 19h | 19i |
| RT | gel (2) h | gel (3) sh | gel (3) sh | gel (3) clear | gel (3) clear | gel (3) clear | gel (3) clear | gel (2) clear | gel (2) sh |
| 60° C. | gel (3) sh | sv clear | lv clear | lv clear | lv clear | lv clear | lv clear | sv sh | sv she |
| 80° C. | v sh | lv clear | lv clear | lv clear | lv clear | lv clear | lv clear | lv sh | sv sh |

Table 6 shows the rheological behavior of various compositions as a function of temperature.

TABLE 6

EHA/AA Weight Ratio at 20 wt. % modified silica using Composition 20

| | 100/0 | 97/3 | 95/5 | 92.5/7.5 | 90/10 | 87.5/12.5 | 85/15 | 80/20 |
|---|---|---|---|---|---|---|---|---|
| | | | | Composition No. | | | | |
| | 29a | 20b | 20c | 20d | 20e | 20f | 20g | 20h |
| RT | h settled | gel (1) h | gel (1) clear | gel (1) clear | gel (2) clear | gel (3) clear | gel (3) clear | gel (2) clear |
| 60° C. | h, ps settled | mv h | mv sh | mv sh | lv clear | lv clear | lv clear | lv clear |
| 80° C. | ps | mv | mv | mv | lv | lv | lv | lv |

Table 7 shows the rheological behavior of various compositions as a function of temperature.

TABLE 7

EHA/AA Weight Ratio at 20 wt. % modified silica using Composition 20

| | 100/0 | 97/3 | 95/5 | 92.5/7.5 | 90/10 | 87.5/12.5 | 85/15 | 80/20 |
|---|---|---|---|---|---|---|---|---|
| | | | | Composition No. | | | | |
| | 21a | 21b | 21c | 21d | 21e | 21f | 21g | 21h |
| RT | h | gel (1) h | gel (1) clear | gel (1) clear | gel (1) clear | gel (1) clear | gel (2) clear | mv clear |
| 60° C. | h | v h | gel (3) sh | gel (3) sh | mv clear | lv clear | lv clear | lv clear |
| 80° C. | h settled | mv h | mv sh | mv clear | lv clear | lv clear | lv clear | lv clear |

EXAMPLE 13

This example shows the effect of surface modification on sol rheology and rheology adjustment with mixtures of sols.
Preparation of Colloidal Dispersion G NALCO 2327 (200.69 g) was charged to a 1-Liter round bottom flask. 1-Methoxy-2-propanol (260 g), 4.80 g PEG2TES and 9.69 g A-174 were added to the colloidal dispersion with stirring. The flask was heated at 90° C. for 2 hr and allowed to cool. A clear blue nonviscous dispersion of modified silica was obtained (Colloidal Dispersion G). The total charge was 0.62 mMole silanes/g silica at a A-174/PEG2TES molar ratio of 75/25.
Preparation of Composition 22

A monomer mixture including 31.5 parts LA, 55.7 parts IBA and 12.8 parts NOA was prepared. The monomer mixture (100 g) was added to Colloidal Dispersion G. The water and alcohol were removed via rotary evaporation. The flask was removed and an additional monomer mixture charge (182.7 g) was added and mixed in. A clear gel was obtained. The gel contained 22.67 wt. % SiO$_2$ as measured by TGA.
Preparation of Colloidal Dispersion H NALCO 2327 (200.0 g) was charged to a 1-Liter round bottom flask. 1-Methoxy-2-propanol (260 g), IOTMS (6.4 g) and A-174 (6.4 g) were added to the colloidal dispersion with stirring. The flask was heated at 90° C. for 2 hr and allowed to cool. A white/blue viscous dispersion of modified silica was obtained. The total charge was 0.62 mMole silanes/g silica at an A-174/IOTMS molar ratio of 50/50.
Preparation of Composition 23

A monomer mixture including 31.5 g LA, 55.7 g IBA and 12.8 g NOA was prepared. The monomer mixture (100.69 g) was added to the above modified silica sol. The water and alcohol were removed via rotary evaporation. The flask was removed and an additional and monomer charge (183.2 g)

was added and mixed in. A clear non-viscous sol was obtained (Composition 23), that contained approximately 22 weight percent $SiO_2$.

Compositions 22 and 23 were mixed in the following proportions (wt. % 22/wt. % 23): 100/0, 88/12, 75/25, 50/50, 25/75 and 0/100. The viscosity dependence on shear rate is shown in Table 8. Viscosities were measured using an ARES rheometer available from Rheometrics Scientific, Inc. of Piscataway, N.J. using cup (27 mm) and bob (25 mm) geometry.

TABLE 8

| Shear Rate | Viscosities vs. Weight Ratio of Composition 22/Composition 23 in Poise | | | | | |
|---|---|---|---|---|---|---|
| (1/sec) | 100/0 | 88/12 | 75/25 | 50/50 | 25/75 | 0/100 |
| 0.10 | 421.32 | 195.74 | 98.47 | 8.92 | 1.61 | |
| 0.16 | 329.60 | 176.34 | 96.80 | 11.29 | 0.52 | |
| 0.25 | 234.99 | 134.82 | 77.30 | 11.98 | 0.79 | |
| 0.40 | 159.49 | 95.09 | 56.15 | 10.46 | 0.75 | |
| 0.63 | 106.50 | 66.31 | 39.20 | 8.28 | 0.83 | |
| 1.00 | 70.68 | 44.22 | 27.04 | 6.20 | 0.68 | |
| 1.58 | 46.77 | 29.79 | 18.52 | 4.66 | 0.61 | |
| 2.51 | 31.05 | 20.12 | 12.68 | 3.44 | 0.56 | |
| 3.98 | 20.72 | 13.69 | 8.76 | 2.59 | 0.49 | |
| 6.31 | 13.97 | 9.40 | 6.15 | 1.97 | 0.44 | 0.146 |
| 10.00 | 9.55 | 6.57 | 4.38 | 1.52 | 0.40 | 0.153 |
| 15.85 | 6.63 | 4.66 | 3.18 | 1.20 | 0.37 | 0.151 |
| 25.12 | 4.69 | 3.77 | 2.39 | 0.97 | 0.34 | 0.150 |
| 39.81 | 3.37 | 2.50 | 1.79 | 0.80 | 0.32 | 0.151 |
| 63.10 | 2.48 | 1.89 | 1.39 | 0.67 | 0.30 | 0.151 |
| 100.0 | 1.87 | 1.46 | 1.10 | 0.58 | 0.28 | 0.151 |
| 158.49 | 1.44 | 1.15 | 0.89 | 0.50 | 0.27 | 0.151 |
| 251.19 | 1.13 | 0.93 | 0.74 | 0.45 | 0.26 | 0.152 |
| 398.11 | 0.91 | 0.77 | 0.62 | 0.40 | 0.25 | 0.153 |
| 630.60 | | 0.64 | 0.54 | 0.37 | | 0.156 |

EXAMPLE 14

This is example shows various gel preparations using different monomers and different surface modifiers.

Preparation of Colloidal Dispersion I

NALCO 2327 (400.32 g) was charged to a 0.9 Liter jar. 1-Methoxy-2-propanol (450.6 g), 12.3 g IOTMS and 12.78 g A-174 were mixed together and added to the colloidal dispersion with stirring. The jar was sealed and heated at 80° C. for 17 hr resulting in a white slurry of modified silica. The total charge was 0.62 mMole silanes/g silica at an A-174/IOTMS molar ratio of 50/50 (Colloidal Dispersion I).

Preparation of Composition 24

A 2-Liter round-bottom flask was charged with 300 Colloidal Dispersion I and 105.86 g HDDA. The water and alcohol were removed via rotary evaporation until the total solid weight was 162.56 g. A clear gel was obtained (Composition 24). The gel contained 34.33 wt. % $SiO_2$ as measured by TGA.

Composition 24 was used to prepare formulations shown in Table 9. The typical procedure was as follows: Composition 24 (in 2 gram amounts) was charged to a series of 2 dram screw cap vials. Additives were then added to give the desired final wt. % silica and fluid composition.

TABLE 9

| Composition | $SiO_2$ (Wt. %) | HDDA (Wt. %) | IBA (Wt. %) | Properties at RT | Properties at 80° C. |
|---|---|---|---|---|---|
| 24a | 28 | 72 | 0 | gel (2) clear | lv clear |

TABLE 9-continued

| Composition | $SiO_2$ (Wt. %) | HDDA (Wt. %) | IBA (Wt. %) | Properties at RT | Properties at 80° C. |
|---|---|---|---|---|---|
| 24b | 28 | 68.4 | 3.6 | gel (2) clear | lv clear |
| 24c | 28 | 64.8 | 7.2 | hv clear | lv clear |
| 24d | 28 | 61.2 | 10.8 | lv clear | lv clear |
| 24e | 22 | 78 | 0 | hv clear | lv clear |
| 24f | 22 | 74.1 | 3.9 | mv clear | lv clear |

TABLE 10

| Composition | $SiO_2$ (Wt. %) | HDDA (Wt. %) | IBA (Wt. %) | MIBA (Wt. %) | Properties at RT | Properties at 80° C. |
|---|---|---|---|---|---|---|
| 22g | 25 | 75 | 0 | 0 | gel (2) clear | lv clear |
| 22h | 25 | 73 | 0 | 2 | gel (1) clear | lv clear |
| 22i | 25 | 70 | 0 | 5 | gel (1) clear | mv clear |
| 22j | 25 | 65 | 0 | 10 | gel (1) clear | mv clear |
| 22k | 25 | 66.5 | 3.5 | 5 | gel (1) clear | mv clear |
| 22l | 25 | 61.75 | 3.25 | 10 | gel (2) clear | lv clear |
| 22m | 25 | 48.45 | 2.55 | 24 | lv clear | lv clear |
| 22n | 25 | 60.13 | 4.87 | 10 | gel (2) clear | lv clear |
| 22o | 25 | 58.28 | 4.72 | 12 | gel (2) clear | lv clear |
| 22p | 25 | 54 | 6 | 15 | hv clear | lv clear |

TABLE 11

| Composition | $SiO_2$ (Wt. %) | HDDA (Wt. %) | IBA (Wt. %) | HEMA (Wt. %) | Properties at RT | Properties at 80° C. |
|---|---|---|---|---|---|---|
| 22q | 25 | 100 | 0 | 0 | gel (2) clear | lv clear |
| 22r | 25 | 100 | 0 | 2 | gel (2) clear | lv clear |
| 22s | 25 | 100 | 0 | 5 | gel (1) clear | lv clear |
| 22t | 25 | 95 | 5 | 5 | gel (1) clear | lv clear |
| 22u | 25 | 95 | 5 | 10 | gel (1) clear | hv clear |

EXAMPLE 15

Preparation of Composition 25

NALCO 2327 (400.02 g) was charged to a 0.9 Liter jar. 1-Methoxy-2-propanol (450.1 g), 11.86 g IOTMS and 12.59 g A-174 were mixed together and added to the NALCO 2327 with stirring. The jar was sealed and heated at 80° C. for 17 hr resulting in a white slurry of modified silica. The total charge was 0.62 mmole silane/g silica at an A-174/IOTMS molar ratio of 50/50. A 1-Liter round-bottom flask was charged with the 432.38 g of the slurry and 79.56 g IBA. The water and alcohol were removed via rotary evaporation. A clear somewhat viscous fluid was obtained (Composition 25) that contained 50.33 wt. % $SiO_2$ as measured by TGA.

Composition 25 was used to prepare formulations shown in Table 9. The typical procedure was as follows: Composition 25 (in 2 gram amounts) was charged to a series of 2 dram screw cap vials. Additives were then added to give the desired final wt. % silica and fluid composition.

TABLE 12

| Composition | SiO$_2$ (Wt. %) | IBA (Wt. %) | Pentadecane (Wt. %) | Observed Properties | | | |
|---|---|---|---|---|---|---|---|
| | | | | 10° C. | RT | 60° C. | 80° C. |
| 25a | 39.4 | 39.4 | 21.2 | nm | gel (1) clear | nm | mv clear |
| 25b | 30 | 49 | 21 | lv clear | lv clear | lv clear | lv clear |
| 25c | 30 | 46.9 | 23.1 | gel (2) clear | gel (2) clear | lv clear | lv clear |
| 25d | 30 | 45.5 | 24.5 | na | gel (2) clear | sv clear | lv clear |
| 25e | 25 | 67.5 | 7.5 | sv clear | lv clear | lv clear | lv clear |
| 25f | 25 | 60 | 15 | sv clear | lv clear | lv clear | lv clear |
| 25g | 25 | 52.5 | 22.5 | sv clear | lv clear | lv clear | lv clear |
| 25h | 25 | 48.8 | 26.2 | gel (3) clear | mv clear | lv clear | lv clear |
| 25i | 25 | 50.6 | 24.4 | na | mv sh | mv sh | lv sh |
| 25j | 25 | 45 | 30 | na | mv sh | lv hazy | lv hazy |
| 25k | 25 | 41.3 | 33.7 | mv hazy | mv hazy | mv hazy | lv hazy |
| 25l | 25 | 37.5 | 37.5 | mv hazy | mv hazy | mv hazy | lv hazy |

EXAMPLE 16

Preparation of Composition 26:

NALCO 2327 (400.15 g) was charged to a 0.9 Liter jar. 1-Methoxy-2-propanol (450.33 g), 18.08 g IOTMS and 6.39 g A-174 were mixed together and added to the colloidal dispersion with stirring. The jar was sealed and heated to 80° C. for 17 hr resulting in a white slurry of modified silica. The total charge was 0.62 mmole silane/g silica at a A-174/IOTMS molar ratio of 25:75. A 1-Liter round-bottom flask was charged with the 150 g of the slurry and 50.17 g lauryl acrylate. The water and alcohol were removed via rotary evaporation until the total solid weight was 80.22 g. A clear low viscosity fluid was obtained (Composition 26), that contained 35.46 wt. % SiO$_2$ as measured by TGA.

Composition 26 was used to prepare formulations shown in Tables 13–17. The typical procedure was as follows: Composition 26 (in 2 gram amounts) was charged to a series of 2 dram screw cap vials. Additives were then added to give the desired final wt. % silica and fluid composition.

TABLE 13

| Composition | SiO$_2$ (Wt. %) | Lauryl acrylate (Wt. %) | 1-methoxy-2-propanol (Wt. %) | Properties at RT | Properties at 80° C. |
|---|---|---|---|---|---|
| 26a | 25 | 75 | 0 | lv | lv clear |
| 26b | 25 | 71.3 | 3.7 | gel (3) sh | lv hazy |
| 26c | 25 | 69.8 | 5.2 | gel (2) sh | hv hazy |
| 26d | 25 | 67.5 | 7.5 | gel (1) sh | gel (2) hazy |

TABLE 14

| Composition | SiO$_2$ (Wt. %) | LA (Wt. %) | HEMA (Wt. %) | Properties at RT | Properties at 80° C. |
|---|---|---|---|---|---|
| 26e | 25 | 75 | 0 | lv clear | lv clear |
| 26f | 25 | 67.5 | 7.5 | mv clear | lv clear |
| 26g | 25 | 60 | 15 | gel (3) clear | hv clear |

TABLE 15

| Composition | SiO$_2$ (Wt. %) | LA (Wt. %) | NOA (Wt. %) | Properties at RT | Properties at 80° C. |
|---|---|---|---|---|---|
| 26h | 25 | 75 | 0 | lv clear | lv clear |
| 26i | 25 | 71.3 | 3.7 | lv clear | lv clear |
| 26j | 25 | 67.5 | 7.5 | lv clear | lv clear |
| 26k | 25 | 56.3 | 18.7 | sv clear | lv clear |
| 26l | 25 | 46.5 | 28.5 | sv clear | vl clear |

TABLE 16

| Composition | SiO$_2$ (Wt. %) | LA (Wt. %) | AA (Wt. %) | Properties at RT | Properties at 80° C. |
|---|---|---|---|---|---|
| 26m | 25 | 75 | 0 | lv | lv |
| 26n | 25 | 60 | 15 | fluid | lv clear |
| 26o | 25 | 57.8 | 17.2 | slightly viscous fluid | lv clear |
| 26p | 25 | 56.3 | 18.7 | ps hazy | lv hazy |
| 26q | 25 | 46.5 | 28.5 | ps hazy | vl hazy |

TABLE 17

| Composition | SiO$_2$ (Wt. %) | LA (Wt. %) | EEEA (Wt. %) | Properties at RT | Properties at 90° C. |
|---|---|---|---|---|---|
| 26r | 25 | 75 | 0 | lv | lv |
| 26s | 20 | 40 | 40 | gel (3) clear | very viscous clear |
| 26t | 20 | 57.8 | 17.2 | gel (3) clear | vl clear |
| 26u | 25 | 46.5 | 28.5 | gel (3) clear | hv hazy |

EXAMPLE 17

Preparation of Composition 27

NALCO 2327 (300.2 g) was charged to a 0.9 Liter jar. 1-Methoxy-2-propanol (337.2 g) and PEG3TES (25.06 g) were mixed together and added to the colloidal dispersion with stirring. The jar was sealed and heated to 80° C. for 17 hr resulting in a clear, blue dispersion of modified silica. The total charge was 0.5 mmole silane/g silica was used. A 250 mL round-bottom flask was charged with 50.01 g of the blue dispersion and 17.4 g ethoxyethoxyethyl acrylate. Water and alcohol were removed via rotary evaporation until the total solid weight was 28.52 g. A clear low viscosity sol was obtained. The sol contained 33.59 wt. % SiO$_2$ as measured by TGA.

Composition 27 was used to prepare formulations shown in Table 18. The typical procedure was as follows: Composition 27 (in 2 gram amounts) was charged to a series of 2 dram screw cap vials. Additives were then added to give the desired final wt. % silica and fluid composition.

mixed together and added to the sol with swirling. The jar was sealed and heated to 80° C. for 26 hr resulting in a white paste. Shaking and stirring resulted in a white fairly fluid

TABLE 18

| Composition | SiO$_2$ (wt. %) | EEEA (wt. %) | LA (wt. %) | Thermal Properties | | | | | |
|---|---|---|---|---|---|---|---|---|---|
| | | | | 10° C. | RT | 40° C. | 50° C. | 60° C. | 80° C. |
| 27a | 28.7 | 80 | 20 | NA | gel (1) haze | gel (1) haze | gel (1) haze | vl clear | lv clear |
| 27b | 29.7 | 83.5 | 16.5 | NA | gel (1) sh | vl clear | lv clear | lv clear | lv clear |
| 27c | 25 | 84 | 16 | NA | gel (1) sh | mv sh | lv clear | lv clear | lv clear |
| 27d | 30.6 | 87 | 13 | gel (1) sh | hv clear | lv clear | lv clear | lv clear | lv clear |

EXAMPLE 18

This example shows the difference between the ultimate particle size of modified silica particles of the invention and fumed silica.
Preparation of Composition 28

NALCO 2327 (400 g) was charged to a 0.9 Liter jar. 1-Methoxy-2-propanol (449 g), PEG2TES (9.48 g) and A-174 (19.4 g) were added to the colloidal dispersion with stirring. The flask was heated at 80° C. for 18 hr resulting in a clear blue nonviscous dispersion of modified silica. The total charge was 0.62 mMole silane/g silica at a A-174/PEG2TES molar ratio of 75/25.

A monomer mixture 31.4 parts LA, 55.94 parts IBA and 12.71 parts NOA was prepared. The monomer mixture (78.74 g) and 118.72 g of the blue nonviscous dispersion were charged to a 500 ml round bottom flask. The water and alcohol were removed via rotary evaporation to give a clear gel at RT (Composition 28). The gel contained 21.45 wt. % SiO$_2$ as measured by TGA.

Composition 28 (5 ml) was charged to a plastic syringe and filtered through a 1 µm pore syringe filter (Glass Fiber ACRODISC, 1 micrometers pore size, 25 mm diameter available from Fisher Scientific of Pittsburgh, Pa.). The material filtered easily. The silica content of the filtrate was 21.44 wt. % as measured by TGA.

As a comparison AEROSIL R972 (trade designation for hydrophobic fumed silica available from Degussa Corp. of Ridgefield Park, N.J.) was mixed into a monomer ratio with the same composition. A 4 oz. jar was charged with 9.53 g NOA, 42 g IBA and 23.72 g LA and heated to dissolve the NOA. The monomer mixture was poured into a 250 ml plastic beaker. The AEROSIL R972 was added incrementally with stirring. A 3-blade propeller was used at a high stir rate. The AEROSIL R972 (8.77 g) was added over a period of 125 min. The resultant mixture was clear viscous fluid. The silica content was 9.37 wt. % as measured by TGA.

The fluid (5 ml) was charged to a plastic syringe and filtered through a 1 µm pore syringe filter (Glass Fiber ACRODISC, 1 micrometers pore size, 25 mm diameter). The material filtered with much difficulty. The total fluid that could be forced through was a 24 drops. This fluid was low viscosity. The silica content after filtration was measured at 0 wt. % as measured by TGA.

EXAMPLE 19
Preparation and jetting of Composition 29

A surface modified nanoparticle sol was prepared as follows: NALCO 2327 (400 g) was charged to a 0.9 Liter jar. MIPA (450 g), A-174 (12.3 g) and IOTMS (11.61 g) were suspension. In a separate container a monomer mixture was prepared from 1.55 parts EEEA, 1.55 parts IBA, and 1 part HDDA. A 1-Liter round-bottomed flask was charged with the modified sol (408.26 g) and the monomer mixture (114.65 g). The water and alcohol were removed via rotary evaporation followed by trap to trap distillation. A clear nonviscous sol was obtained (Composition 29). Thermogravimetric analysis showed it to be 39.76 weight percent SiO$_2$.

Composition 29 was jetted with high drop velocity using a TRIDENT PIXEL JET printhead with 64 channels available from Trident International, Inc. of Brookfield, Conn., USA. The sol was jetted at 4 kHz with a 16 microsecond pulse width. The jetting temperature was varied from 40–60° C. and the driving voltage was varied from 35–45 V. The drop velocity was measured 100 microseconds after firing.

The jetting results are shown in Table 19. The viscosity, of the materials, was controlled by printhead temperature. The table shows that the viscosity and voltage have a significant effect on drop velocity. Lower viscosity and higher voltage result in higher drop velocity. Satellite formation, however, was also increased as velocity increases. Optimization was needed to achieve high velocity and as few satellites as possible. In this system, jetting at 45° C. at 45V gave a drop velocity of 8 m/s. Thermal Gravimetric Analysis (TGA) gave a silica content of the sol before (39.48 weight percent) and after jetting (40.09 weight percent). This shows that essentially all the silica was jetted; and that silica was not removed by the in-line ink filter of the printing apparatus.

TABLE 19

| Temperature (° C.) | Viscosity (mPa · s) | Voltage (V) | Velocity (m/s) | Satellites |
|---|---|---|---|---|
| 40 | 13.0 | 40 | 3.95 | few |
| 45 | 11.8 | 40 | 5.52 | some |
| 55 | 8.4 | 40 | 7.08 | some |
| 60 | 6.3 | 40 | 7.61 | lots |
| 40 | 13.0 | 45 | 7.0 | some |
| 45 | 11.8 | 45 | 8.05 | some |
| 50 | 9.8 | 45 | 8.87 | lots |
| 55 | 8.4 | 45 | 9.44 | lots |
| 60 | 6.3 | 45 | 9.74 | lots |
| 55 | 8.4 | 35 | 4.83 | few |

EXAMPLE 20
Preparation of Composition 30

A surface modified nanoparticle sol was prepared by combining, in a 250 ml round-bottomed flask with stirring, 50.00 g NALCO 2327 silica sol (41.5 weight percent silica) and 22 g MIPA resulting in a clear blue sol. IOTMS (1.86 g), 2.02 g A-174 and 38 g MIPA were added to the sol with stirring. The flask was placed on the rotary evaporator and cooked (without solvent removal) for 50 min at 82–91° C. At this point, 20 g IBA was added and vacuum applied. The alcohol and water were stripped off at ~90 mbar and 70° C. The material was further stripped at room temperature and 200 mTorr to obtain a clear colorless sol (Composition 30) having 50.09 weight percent $SiO_2$ and a Brookfield viscosity of ~100 mPa·s.

Jetting of Samples J2A–J2C obtained from Composition 30

Inkjet printing of surface modified nanoparticle sols was also demonstrated using a MICROFAB single nozzle squeeze mood piezo ink jet printhead available from Microfab Technologies, Inc. of Plano, Tex., USA. Composition 30 was diluted in IBA or a combination of IBA and IOA as described in Table 20. All jetting was done at 1 kHz frequency with a 50 micrometer diameter nozzle. The samples were filtered with 0.45 μm Teflon filter before being loaded into the printhead reservoir. The pressure (P), voltage ($V_1$) and pulse width ($T_1$ and $T_2$) were adjusted to achieve optimal jetting properties. The jetting was conducted at room temperature and the results are shown in Table 20. No nozzle clogging was observed during the jetting experiments.

TABLE 20

| Sample No. | Formulation | Viscosity (mPa · s) | Jetting Parameters (volts, μs) | Weight % $SiO_2$ |
|---|---|---|---|---|
| J2A | 3 ml sol + 1.5 ml IBA | 28.4 | Pressure: −5.33, $V_1$ = −17, $T_1$ = 36 us | 36.74 |
| J2B | 3 ml sol + 1.5 ml IOA | 15.4 | Pressure: −10.26, $V_1$ = −10, $T_1$ = 36 us | 38.39 |
| J2C | 1.5 ml sol + 3 ml IOA | 8.4 | Pressure −8.53, $V_1$ = 0, $T_1$ = 65 us | 22.24 |

The results show that the viscosity of surface modified nanoparticle sols is strongly effected by the fluid vehicle medium. Samples J2A and J2B have similar silica content and surface modification, yet when the dispersed medium was changed from IBA to an IBA/IOA blend, the viscosity of the composition decreased by 50%. This resulted in the two samples having substantially different optimum jetting conditions.

EXAMPLE 21
Preparation of Compositions 31 through 35

A series of five samples (Samples 31 to 35) were made using a monomer mix of EEEA/IBA/HDDA (3.3/3.5/1) with different ratios IOTMS to A-174.

NALCO 2327 was charged to 100 ml round-bottomed flask and 12 g MIPA was added with stirring, resulting in a clear blue sol. Silica surface modifier and 20 g MIPA were added with stirring as shown in Table 3. The flask was placed on a rotary evaporator and heated (without solvent removal) for 105 min at 82–91° C. At this point 10 g of monomer mix was added and vacuum applied. The alcohol and water were stripped off at ~90 mbar and 70° C. The material was further stripped at room temperature at 200 mTorr to obtain a clear colorless sol. All sols were approximately 50 weight percent silica. One weight percent IRGACURE 184 photoinitiator was added to each sample.

Samples in Table 21 were coated at 0.18 mm between silicone treated polyester release liners using a knife coater. The coated liners were passed through a UV processor (Fusion UV Systems, Inc. of Rockville, Md., Model 6RQN) at 15.2 meter/min using an H-Bulb with an intensity of 0.576W/cm². Dynamic Mechanical Analysis (DMA) was conducted according to test method ASTM 4065 using a DMS 200 available from Seiko Instruments of Loveland, Ohio, USA.

TABLE 21

| Sample | Silica Surface Modifier(s) Used | Viscosity (mPa · s) | $T_g$ (° C.) | Storage Modulus (Pa) |
|---|---|---|---|---|
| Composition 31 | 1.6 g IOTMS | Gel (>1000) | −9.6 | 1.185e + 7 |
| Composition 32 | 1.16 g IOTMS, 0.44 g A-174 | 103.90 | −3.7 | 1.279e + 8 |
| Composition 33 | 0.80 g IOTMS, 0.80 g A-174 | 52.900 | −4.5 | 7.674e + 7 |
| Composition 34 | 0.44 g IOTMS, 1.16 g A-174 | 44.600 | −1.1 | 1.639e + 8 |
| Composition 35 | 1.6 g A-174 | 81.100 | 2.8 | 3.193e + 8 |

The data shows that surface functionalization, particularly with polymerizable groups, also had a significant effect on the mechanical properties of the crosslinked polymeric matrix. Table 21 shows there is a clear dependence of glass transition temperature and tensile modulus on the amount of methacrylate groups (A-174) attached to the particle surface. Higher A-174 content leads to higher Tg and storage modulus.

EXAMPLE 22
Preparation of Composition 36

An ink was prepared by combining the following ingredients: 0.3 g of MICROLITH C-K pigment chip (42 weight percent PIGMENT BLACK 7 in a vinyl chloride/vinyl acetate copolymer, available from CIBA-GEIGY of Ardsley, N.Y., USA), 1.75 g 906 ABRASION RESISTANT COATING, 3 g of a monomer mix including 3.5 parts EEEA/3.5 parts IBA/1 part HDDA, 0.22 g of a mixture of 3 parts IRGACURE 651/1 part IRGACURE 819, and 0.4 parts isopropylthioxanthone (IPTX). The materials were combined in a 6 dram vial, protected from light, and mixed using a roller mill overnight. This sample was coated out onto 3870 High Intensity sheeting (3M) at 0.54 mil wet film thickness using a #6 wire wound rod mounted in a K-coater (K Control Coater (KCC) Model #303, available from Testing Machines, Inc. of Amityville, N.Y., USA), and cured using a Variable Speed UV Cure Conveyorized System Model #C18/400/2 (available from American Ultraviolet of Lebanon, Ind., USA) under the following conditions: one bulb, 300 watts per inch (medium pressure mercury vapor lamp), 12.6 meter/min, 320 mj/cm² intensity, air atmosphere.

The sample cured fully (tack free) in 2 passes to yield a film which showed 100% adhesion as measured by a 90 degree crosshatch tape snap test, performed as follows. A crosshatch pattern of 25-3 mm squares was etched into the UV-cured film using a clean razor blade held at 45 degree angle to the film surface. A piece of 3M 610 tape was placed over the crosshatch pattern, rubbing hard to ensure complete adhesion to the UV-cured film. The 610 tape was then snapped off the surface of the UV-cured film, at a 90 degree angle, in one brisk motion, and the % adhesion calculated based on the number of individual squares still retaining the UV-cured film. In addition, the mar/scratch resistance of this cured film was fair to good.

EXAMPLE 23

Compositions 36 to 43

This example shows the viscosity changes with addition of surface modified silica particles.

TABLE 22

| Composition | Formulation | Surface Modified SiO$_2$ (weight percent) | Viscosity (mPa · s) |
| --- | --- | --- | --- |
| 36 (comparative) | 20 parts IBA | 0 | 7.23 |
| 37 | 10 parts IBA 10 parts Composition 1 | 20 | 12.5 |
| 38 | 5 parts IBA 15 parts Composition 1 | 30 | 20.2 |
| 39 | 20 parts Composition 1 | 40 | 42.5 |
| 40 (comparative) | 19 parts IBA 1 parts EBECRYL 810 | 0 | 8.25 |
| 41 | 9 parts IBA 1 parts Ebecryl 810 10 parts Composition 1 | 20 | 15.1 |
| 42 | 4 parts IBA 1 part EBECRYL 810 15 parts Composition 1 | 30 | 23.8 |
| 43 | 1 part EBECRYL 810 19 parts Composition 1 | 38 | 46.5 |

Viscosity was measured at 25° C. using a Rheometric SR-200 Controlled stress rheometer having a cup and bob geometry available from Rheometric Scientific, Inc. of Piscataway, N.J., USA.

EXAMPLE 24

This example describes the preparation of a yellow, thermally reversible gel ink (Composition 44).

A monomer mixture of 83 parts IBA and 17 parts NOA was prepared. A 2-Liter round-bottom flask (large neck) was charged with 702.57 g Colloidal Dispersion G and 237.40 g monomer mixture. Water and alcohol were removed via rotary evaporation at reduced pressure until the net weight was 542.8 g. The flask was removed and an additional 170.0 g Colloidal Dispersion G and 57.4 g monomer mixture were added. The remaining alcohol and water were removed via rotary evaporation at reduced pressure. A clear, reversible gel was obtained. The gel contained 36.33 weight percent silica as measured by thermal gravimetric analysis. Gas chromatographic analysis confirmed that no alcohol remained in the sample.

A yellow pigment dispersion was prepared as follows: 5.87 parts SUNBRITE YELLOW 12 PIGMENT, 273–0753, lot # B62847 from Sun Chemicals of Fort Lee, N.J. and 94.13 parts IBA were mixed by adding 2 mm glass balls and turning on rollers for 120 hours.

An ink was prepared by combining 9.0 parts NOA, 2.9 parts IRGACURE 819, 34.7 parts of the yellow pigment dispersion, and 53.4 parts of the gel described above and placing the mixture in an 80° C. oven for 30 minutes. The mixture was then stirred until homogeneous yielding a reversible gel.

The ink was coated onto vinyl film (CONTROLTAC PLUS VINYL MARKING FILM) at 13.7 micron thickness using a #6 Meyer rod (R D Specialties of Webster, N.Y.), then cured using an RPC Industries UV processor under a nitrogen atmosphere at 200 millijoule/cm$^2$.

Adhesion was measured using ASTM D 3359-95A, Method B. Color density was measured using a Gretag SPM55 spectrophotometer. The ink showed 100% adhesion to the vinyl film, with reflective yellow color density of 1.122.

EXAMPLE 25

This example describes the preparation of a black, thermally reversible gel ink (Composition 45).

A monomer mixture of 83 parts IBA and 17 parts NOA was prepared. A 2-Liter round-bottom flask (large neck) was charged with 702.57 g Colloidal Dispersion G and 237.40 g monomer mixture. Water and alcohol were removed via rotary evaporation at reduced pressure until the net weight was 542.8 g. The flask was removed and an additional 170.0 g Colloidal Dispersion G and 57.4 g monomer mixture were added. The remaining alcohol and water were removed via rotary evaporation at reduced pressure. A clear, reversible gel was obtained. The gel contained 36.33 weight percent silica as measured by thermal gravimetric analysis. Gas chromatographic analysis confirmed that no alcohol remained in the sample.

A black pigment dispersion was prepared as follows: 12.64 parts BLACK PIGMENT, 247–3007, lot #T80805 from Sun Chemicals of Fort Lee, N.J. and 87.46 parts IBA were mixed by adding 2 mm glass balls and turning on rollers for 120 hours.

An ink was prepared by combining 8.5 parts NOA, 3.0 parts IRGACURE 819, 34.9 parts of the black pigment dispersion, and 53.6 parts of the gel described above and placing the mixture in an 80° C. oven for 30 minutes. The mixture was then stirred until homogeneous.

The ink was coated onto vinyl film (3M CONTROLTAC PLUS VINYL MARKING FILM) at 13.7 microns thickness using a #6 Meyer rod (R D Specialties of Webster, N.Y., USA), then cured using the RPC Industries UV processor under a nitrogen atmosphere at 200 millijoule/cm$^2$.

Adhesion was measured using cross hatch method ASTM D 3359-95A, Method B. Color density was measured using a Gretag SPM55 spectrophotometer. The ink showed 100% adhesion to the vinyl film, with reflective black color density of 1.978.

EXAMPLE 26

This example describes the preparation of a magenta thermally reversible gel ink (Composition 46).

NALCO 2327 colloidal silica (400.2 g) was charged to a 1-quart jar. 1-Methoxy-2-propanol (450.21 g), 9.37 g PEG2TES and 18.92 g A-174 were mixed together and added to the colloidal dispersion with stirring. The jar was sealed and heated to 80° C. for 17 hr. This resulted in a clear, blue dispersion of modified silica.

A monomer mixture of 83 parts IBA and 17 parts NOA was prepared. A 2-Liter round-bottom flask (large neck) was charged with 702.57 g of the above modified silica and 237.40 g of the monomer mixture. Water and alcohol were removed via rotary evaporation at reduced pressure until the total weight was 542.8 g. The flask was removed and an additional 170.0 g modified silica dispersion and 57.4 g of the monomer mixture was added. The remaining alcohol and water were removed via rotary evaporation at reduced pressure resulting in a clear gel. The gel contained 36.33 weight percent silica as measured by TGA. GC confirmed that no alcohol remained in the sample.

A magenta pigment dispersion was prepared by combining: 11.52 parts Sunbrite red 52:1 pigment (from Sun Chemicals of Fort Lee N.J., USA) and 88.48 parts IBA were mixed by adding 2 mm glass balls and turning on rollers for 120 hours.

An ink was prepared by combining 8.6 parts NOA, 3.0 parts Irgacure 819, 34.0 parts of the magenta pigment dispersion, and 54.5 parts of the gel prepared above and placing the mixture in an 80° C. oven for 30 minutes. The mixture was then stirred until homogeneous.

The ink was coated onto vinyl film (3M CONTROLTAC PLUS VINYL MARKING FILM) at 13.7 μm thickness using a #6 Meyer rod, then cured using an RPC Industries UV processor under a nitrogen atmosphere at 200 mJ/cm$^2$.

Adhesion was measured using cross hatch method ASTM D 3359-95A, Method B. Color density was measured using a Gretag SPM55 spectrophotometer. The ink showed 100% adhesion to the vinyl film, with reflective magenta color density of 1.843.

Taken together, the four colored inks of Compositions 18 44, 45 and 46 form an ink set.

EXAMPLE 27

This example describes the preparation of a well-dispersed pigmented ink.

Composition 25 (12 parts) was combined with 8 parts EEEA with mixing. The composition contained approximately 30 weight percent $SiO_2$, and its viscosity was 10.8 cP at 25° C. showing Newtonian behavior up to a maximum accessible shear rate of 3000 s$^{-1}$.

A cyan ink containing the above composition was prepared by adding to the above composition 0.4 parts SPECTRA PACC BLUE 15:4 PIGMENT, 249–3054,D27008 from Sun Chemicals of Fort Lee N.J. The ink was allowed to mix over rollers for 18 hours. The ink viscosity at 25° C. was 12.8 cP also showing Newtonian behavior up to a maximum accessible shear rate of 3000 s$^{-1}$.

Ink viscosity was measured using a SR-200 controlled stress rheometer from Rheometric Scientific of Piscataway, N.J. The cup and bob geometry was used. The ink was jetted using a XAAR XJ128–200 piezo printhead at a resolution of 125×116 dots per cm. The composition jetted well.

EXAMPLE 28
Preparation of Compositions 47–54

Composition 29 was formulated with additional mono and di-functional acrylates and urethane acrylate macromers in this example. It was blended at 10, 20 and 40 weight percent into two different monomer/macromer formulations. Compositions 47–50 contained 20 weight percent EBECRYL 8402 in a monomer mix of EEEA/IBA/HDDA at 4 parts/2 parts/1 part ratio, respectively. Compositions 51–54 contained 20 weight percent EBECRYL 4830 in a monomer mix of EEEA/IBA/HDDA at 3 parts/3 parts/1 part ratio, respectively.

The formulations were coated using a No. 6 wire wound coating rod (available from R. D. Specialties Inc. of Webster, N.Y., USA) at a nominal wet thickness of 0.014 mm and cured using a UV processor (obtained from PRC Industry of Plainfield, Ill., USA) having a medium pressure mercury lamp with an intensity of 0.335 J/cm$^2$, and operating at a web speed of 15.4 meter/min with nitrogen atmosphere, on 3M SCOTCHLITE 3870 REFLECTIVE SHEETING— HIGH INTENSITY GRADE (an adhesive coated white retroreflective sheet available from 3M Company of St. Paul, Minn.). Adhesion, gloss, Taber abrasion, solvent resistance and weathering studies are reported in Table 4. The resultant films, in all cases, retained good clarity and gloss.

It is clear that the film abrasion resistance and solvent resistance increased rapidly with increasing silica content. The viscosity, however, showed a gradual increase with increasing silica content. Adhesion of the films to the substrate was not affected at lower silica content, yet decreased somewhat at higher silica content.

TABLE 23

| Composition | Wt. % Silica | Viscosity (mPa · s) | Adhesion | Initial Gloss | Taber Abrasion (%) | Solvent Resistance |
|---|---|---|---|---|---|---|
| 47 | 0 | 12.7 | 99 | 129.5 | 48.6 | 5 |
| 48 | 4 | 15.5 | 98 | 129.8 | 58.6 | 7 |
| 49 | 8 | 21.4 | 95 | 135.5 | 71.7 | 10 |
| 50 | 16 | 33.1 | 35 | 128.7 | 86.1 | 12 |
| 51 | 0 | 19.6 | 97 | 124.6 | 38.2 | 8 |
| 52 | 4 | 19.6 | 100 | 127 | 32.1 | 6 |
| 53 | 8 | 25.5 | 88 | 119.1 | 44.6 | 12 |
| 54 | 16 | 42.7 | 40 | 118.7 | 47.7 | 7 |

In Table 23 the following test methods were used:

Adhesion was measured according to ASTM 3359-95A Standard Test Methods for Measuring Adhesion by Tape Test, Method B. Film surface gloss was measured according to ASTM D523 Standard Test Method for Specular Gloss, measured at 60 degrees. Taber Abrasion was measured according to ASTM D4060 Standard Test Method for Abrasion Resistance of Organic Coatings by Taber Abraser (40 cycles using a CS 10 wheel and 1 kg weight). Solvent resistance was tested by methyl ethyl ketone (MEK) double rub as follows. A hammer head (680 g) was fitted with a piece of felt secured by a rubber band. The device was soaked in the MEK and rubbed by hand across the coating using a gentle back and forth motion (one cycle is a double rub). The number of double rubs was recorded when the coating in the rubbed area had been completely removed as judged by eye.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A method of forming an ink jetted feature, comprising the steps of:
    (a) providing a composition, said composition comprising a plurality of nanometer-sized, surface modified, inorganic oxide particles dispersed in an energy curable fluid vehicle;
    (b) ink jetting the composition onto a substrate to form a printed feature; and
    (c) exposing the printed feature to an amount of curing energy under conditions effective to at least partially cure the energy curable fluid.

2. The method of claim 1, wherein the curable composition comprises reversible gel characteristics in which the composition exists as a gel in a first state and exists as a fluid with an ink jettable viscosity in a second state.

3. The method of claim 1, wherein step (b) includes heating the composition under conditions such that the composition is in a fluid state and has an ink jettable viscosity.

4. The method of claim 1, wherein at least a portion of said curable composition is ink jetted through a piezoelectric ink jet printhead.

5. The method of claim 1, wherein the nanometer-sized, surface modified, inorganic oxide particles are marginally compatible with the fluid vehicle.

6. The method of claim 1, wherein the fluid vehicle comprises one or more radiation curable monomers.

7. The method of claim 1, wherein:
   (a) the fluid vehicle comprises a first, relatively polar, constituent and a second, relatively nonpolar constituent, wherein at least one of said constituents is radiation curable; and
   (b) the nanometer-sized, surface modified, inorganic oxide particles comprise relatively polar and nonpolar surface portions in relative amounts effective to cause the particles to have a desired degree of compatibility with the fluid vehicle.

8. The method of claim 1, wherein the nanometer-sized, surface modified, inorganic oxide particles are obtained by a method comprising reacting nanometer-sized, inorganic oxide particles with at least first and second surface modification agents, wherein one of the first and second surface modification agents is relatively polar as compared to the other.

9. The method of claim 8, wherein the fluid vehicle comprises 10 to 100 parts by weight of N-octyl (meth) acrylamide per 10 to 100 parts by weight of isobornyl (meth)acrylate.

10. The method of claim 9, wherein the fluid vehicle further comprises at least one of 2-(2-ethoxyethoxy) ethyl (meth)acrylate, lauryl (meth)acrylate, and 2-hydroxy ethyl (meth)acrylate.

11. The method of claim 8, wherein the first surface modification agent comprises 3-(meth)acryloyloxypropyltrimethoxysilane and the second surface modification agent comprises isooctyltrimethoxysilane.

12. The method of claim 8, wherein the first surface modification agent comprises methacryloyloxypropyltrimethoxysilane and the second surface modification agent comprises N-(3-triethoxysilylpropyl) methoxyethoxyethyl carbamate.

13. The method of claim 1, wherein the nanometer-sized, surface modified, inorganic oxide particles are obtained by a method comprising reacting nanometer-sized, inorganic oxide particles with at least first and second surface modification agents, wherein the first surface modification agent comprises a moiety that is attachably reactive to the inorganic oxide particles and a branched moiety, and wherein the second surface modification agent includes energy curable functionality.

14. The method of claim 13, wherein the second surface treatment agent comprises a moiety that is attachably reactive to the inorganic oxide particles and an energy curable moiety.

15. The method of claim 13, wherein the first surface modification agent comprises a branched, aliphatic organosilane.

16. The method of claim 15, wherein the first surface modification agent comprises isooctyltrimethoxysilane.

17. The method of claim 15, wherein the second surface treatment agent comprises a gamma-(meth)acryloyloxyalkyl organosilane.

18. The method of claim 15, wherein the second surface treatment agent comprises (meth) acryloyloxypropyltrimethoxysilane.

19. The method of claim 13, wherein the second surface treatment agent comprises a gamma-(meth)acryloyloxyalkyl organosilane.

20. The method of claim 13, wherein the second surface treatment agent comprises (meth) acryloyloxypropyltrimethoxysilane.

21. The method of claim 1, wherein step (a) comprises the steps of:
   (i) determining information comprising at least one desired characteristic of the composition;
   (ii) determining information indicative of a degree of compatibility between the fluid vehicle and the nanometer-sized, surface modified, inorganic oxide particles that is effective to help provide the composition with at least one desired characteristic;
   (iii) causing a plurality of nanometer-sized, inorganic oxide particles to have a surface modification effective to help provide the composition with at least one desired characteristic; and
   (iv) incorporating the surface modified, nanometer-sized, inorganic oxide particles into the fluid vehicle.

22. The method of claim 21, wherein said at least one characteristic comprises a rheological characteristic.

23. The method of claim 22, wherein said Theological characteristics comprises an ability for the composition to exist as a gel in at least one state.

24. The method of claim 22, wherein the Theological characteristic comprises an ability to exist as a gel in a first state and to be an ink jettable fluid in a second state.

25. A composition with reversible gel characteristics, comprising
   (a) an energy curable, fluid vehicle comprising a first, relatively polar, constituent and a second, relatively nonpolar constituent, wherein at least one of said constituents is energy curable; and
   (b) a gel forming agent comprising surface modified, nanometer-sized inorganic oxide particles comprising relatively polar and nonpolar surface portions in relative amounts effective to render the gel forming agent marginally compatible with the fluid vehicle.

26. A method of making an ink jettable composition, comprising the steps of:
   (a) providing an energy curable, fluid vehicle;
   (b) providing a thickening agent that is marginally compatible with the fluid vehicle, wherein the agent comprises surface modified, nanometer-sized, inorganic oxide particles;
   (c) incorporating the thickening agent into the fluid vehicle in an amount such that the composition has reversible thickening characteristics, said composition comprising a first state in which the composition is a fluid having an ink jettable viscosity and a second state in which the composition is thickened relative to the first state.

27. A method of making an ink jettable composition, comprising the steps of:
   (a) providing an energy curable, fluid vehicle comprising a first, relatively polar, constituent and a second, relatively nonpolar constituent, wherein at least one of said constituents is energy curable; and
   (b) providing a gel forming agent comprising surface modified, nanometer-sized inorganic oxide particles comprising relatively polar and nonpolar surface portions in relative amounts such that the gel forming agent is marginally compatible with the fluid vehicle; and
   (c) incorporating a gel forming amount of the gel forming agent into the fluid vehicle.

28. A method of printing, comprising the steps of:
(a) providing an energy curable ink that has reversible gel forming characteristics such that the composition has a gel state and a fluid state, wherein the composition includes surface modified, nanometer-sized inorganic oxide particles; and
(b) causing the composition to be printed onto a substrate to form a printed feature, wherein at least a portion of said printing occurs while the composition is subjected to added energy; and
(c) after printing, gelling the printed feature; and
(d) curing the gelled, printed feature.

29. An energy curable, ink jettable composition, comprising:
(a) an energy curable fluid vehicle; and
(b) a plurality of nanometer-sized particles incorporated into the vehicle and being sufficiently compatible with the vehicle such that the composition has an ink jettable viscosity at a desired printhead temperature when the composition incorporates up to at least about 10 volume percent of said particles.

30. An energy curable, ink jettable composition, comprising:
(a) an energy curable fluid vehicle; and
(b) a plurality of nanometer-sized, surface modified, inorganic oxide particles dispersed in the vehicle, said nanometer-sized, surface modified, inorganic oxide particles being sufficiently compatible with the vehicle such that the composition has an ink jettable viscosity at a desired printhead temperature when the composition comprises at least about 10 volume percent of said particles, and said particles being obtained by surface treating inorganic oxide substrate particles with a combination of surface treatment agents comprising:
(i) a first surface treatment agent comprising a radiation curable moiety and a moiety reactively attachable to the substrate particles; and
(ii) a second surface treatment agent comprising a branched moiety and a moiety reactively attachable to the substrate particles.

31. A method of making an energy curable, ink jettable composition, comprising the steps of:
(a) providing an energy curable fluid vehicle;
(b) providing a plurality of nanometer-sized particles that are sufficiently compatible with the vehicle such that a mixture comprising the particles in the vehicle has an ink jettable viscosity at a desired printhead temperature when the composition comprises at least about 10 volume percent of said particles; and
(c) incorporating ingredients comprising said particles into the vehicle to provide said composition.

32. A method of printing, comprising the steps of:
(a) providing an ink jettable composition comprising a plurality of nanometer sized particles dispersed in an energy curable fluid vehicle, said particles being sufficiently compatible with the vehicle such that a mixture comprising the vehicle and the particles has an ink jettable viscosity at a desired printhead temperature when the composition comprises at least about 10 volume percent of said particles;
(b) causing the composition to be printed onto a substrate to form a printed feature; and
(c) curing the printed feature.

33. A method of making a nanoparticle-containing composition, comprising:
(a) preparing a plurality of composition samples, each sample comprising a plurality of nanometer-sized, surface modified inorganic oxide particles dispersed in an energy curable fluid vehicle, wherein the particles are surface modified with two or more surface treatment agents, and wherein the relative amounts of the surface treatment agents is varied among the samples;
(b) determining an amount of the surface treatment agents that correlates to information indicative of a viscosity profile minimum; and
(c) using the surface treatment agents in an amount proximal to the viscosity profile minimum to prepare a nanoparticle-containing composition comprising a plurality of the nanometer-sized, surface modified, inorganic oxide particles dispersed in the vehicle.

* * * * *

UNITED STATES PATENT AND TRADEMARK OFFICE
CERTIFICATE OF CORRECTION

PATENT NO.     : 6,467,897 B1
DATED          : October 22, 2002
INVENTOR(S)    : Wu, Dong It is certified that error appears in the above-identified patent and that said Letters Patent is hereby corrected as shown below:

Column 2,
Line 61, "Theological" should read -- rheological --.

Column 3,
Line 55, "Theological" should read -- rheological --.

Column 7,
Lines 56 and 64, "Theological" should read -- rheological --.

Column 8,
Line 64, "Theological" should read -- rheological --.

Column 9,
Line 51, "Theological" should read -- rheological --.

Column 11,
Line 64, delete the duplicate word "vehicle".

Column 13,
Line 14, "Theological" should read -- rheological --.

Column 35,
Line 40, delete "20" immediately preceding "NOA".

Signed and Sealed this

Eighth Day of July, 2003

JAMES E. ROGAN
*Director of the United States Patent and Trademark Office*